US012093432B2

(12) United States Patent
Constable et al.

(10) Patent No.: US 12,093,432 B2
(45) Date of Patent: Sep. 17, 2024

(54) TECHNIQUES AND TECHNOLOGIES TO ADDRESS MALICIOUS SINGLE-STEPPING AND ZERO-STEPPING OF TRUSTED EXECUTION ENVIRONMENTS

(71) Applicant: Intel Corporation, Santa Clara, CA (US)

(72) Inventors: Scott Constable, Portland, OR (US); Yuan Xiao, Columbus, OH (US); Bin Xing, Hillsboro, OR (US); Mona Vij, Hillsboro, OR (US); Mark Shanahan, Raleigh, NC (US)

(73) Assignee: INTEL CORPORATION, Santa Clara, CA (US)

( * ) Notice: Subject to any disclaimer, the term of this patent is extended or adjusted under 35 U.S.C. 154(b) by 60 days.

(21) Appl. No.: 17/485,077

(22) Filed: Sep. 24, 2021

(65) Prior Publication Data

US 2022/0012369 A1 Jan. 13, 2022

(51) Int. Cl.
*H04L 29/06* (2006.01)
*G06F 12/0862* (2016.01)
*G06F 12/14* (2006.01)
*G06F 21/52* (2013.01)
*G06F 21/55* (2013.01)
*G06F 21/57* (2013.01)
*G06F 21/74* (2013.01)

(52) U.S. Cl.
CPC .......... *G06F 21/74* (2013.01); *G06F 12/0862* (2013.01); *G06F 12/1416* (2013.01); *G06F 21/52* (2013.01); *G06F 21/554* (2013.01); *G06F 21/577* (2013.01); *G06F 2201/88* (2013.01)

(58) Field of Classification Search
CPC ................. G06F 21/74; G06F 12/0862; G06F 2201/88; G06F 21/52; G06F 21/554; G06F 21/577; G06F 12/1416
See application file for complete search history.

(56) References Cited

U.S. PATENT DOCUMENTS

| 2013/0159665 | A1* | 6/2013 | Kashyap | G06F 9/3001 |
| | | | | 712/E9.023 |
| 2017/0090925 | A1* | 3/2017 | O'Connor | G06F 11/30 |
| 2019/0102546 | A1* | 4/2019 | Cheng | H04L 63/1466 |
| 2022/0108012 | A1* | 4/2022 | Favor | G06F 12/145 |
| 2022/0114002 | A1* | 4/2022 | Hoogerbrugge | G06F 9/45558 |

\* cited by examiner

*Primary Examiner* — Evans Desrosiers
(74) *Attorney, Agent, or Firm* — JAFFERY WATSON MENDOSA & HAMILTON LLP

(57) ABSTRACT

In one embodiment, an apparatus comprises a processing circuitry to detect an occurrence of at least one of a single-stepping event or a zero-stepping event in an execution thread on an architecturally protected enclave and in response to the occurrence, implement at least one mitigation process to inhibit further occurrences of the at least one of a single-stepping event or a zero-stepping event in the architecturally protected enclave.

18 Claims, 28 Drawing Sheets

THREAD CONTROL STRUCTURE 126

| Field | OFFSET (Bytes) | Size (Bytes) | Description |
|---|---|---|---|
| STAGE | 0 | 8 | Enclave execution state of the thread controlled by this TCS. A value of 0 indicates that this TCS is available for enclave entry. A value of 1 indicates that a processer is currently executing an enclave in the context of this TCS. |
| FLAGS 202 | 8 | 8 | The thread's execution flag(s), e.g., including a resume-to-handler (RTH) enable flag (bit) that, when set, enables the RTH feature for the enclave (e.g., once set, cannot be unset for that enclave). |
| OSSA | 16 | 8 | Offset of the base of the State Save Area stack, relative to the enclave base (e.g., page aligned). |
| CSSA 204 | 24 | 4 | Current slot index of an SSA frame (e.g., cleared by EADD and EACCEPT). Includes an RTH enable bit, that when set, enables the RTH feature for the current state-save area (CSSA). |
| NSSA | 28 | 4 | Number of available slots for SSA frames |
| OENTRY | 32 | 8 | Offset in enclave to which control is transferred on EENTER relative to the base of the enclave. |
| AEP | 40 | 8 | The value of the Asynchronous Exit Pointer that was saved at EENTER time. |
| OFSBASGX | 48 | 8 | Offset to add to the base address of the enclave for producing the base address of FS segment inside the enclave. E.g., must be page aligned. |
| OGSBASGX | 56 | 8 | Offset to add to the base address of the enclave for producing the base address of GS segment inside the enclave. E.g., must be page aligned. |
| FSLIMIT | 64 | 4 | Size to become the new FS limit in 32-bit mode. |
| GSLIMIT | 68 | 4 | Size to become the new GS limit in 32-bit mode. |
| RTH_REDZONESIZE 206 | 72 | 8 | E.g., must match the red zone convention assumed by the compiler that is used to compile the enclave. |
| HANDLER 208 | 80 | 8 | Address of the (e.g., signal/AEX) handler that will be invoked on each ERESUME for this enclave thread. |
| RESERVED | 88+ | 4008 | |

```
ENABLING AN ARCHITECTURALLY-PROTECTED EXECUTION ENVIRONMENT FOR CODE IN
AN ARCHITECTURALLY-PROTECTED ENCLAVE IN MEMORY IN RESPONSE TO A FIELD OF A
REGISTER OF A HARDWARE PROCESSOR BEING SET 1202
```

↓

```
DECODING A SINGLE INSTRUCTION COMPRISING AN OPCODE INTO A DECODED SINGLE
INSTRUCTION WITH A DECODER CIRCUIT OF THE HARDWARE PROCESSOR, THE OPCODE
INDICATING AN EXECUTION CIRCUIT IS TO INVOKE A HANDLER TO HANDLE AN
ASYNCHRONOUS EXIT FROM EXECUTION OF THE CODE IN THE ARCHITECTURALLY-
PROTECTED ENCLAVE AND THEN RESUME EXECUTION OF THE CODE IN THE
ARCHITECTURALLY-PROTECTED ENCLAVE FROM WHERE THE ASYNCHRONOUS EXIT
OCCURRED 1204
```

↓

```
EXECUTING THE DECODED SINGLE INSTRUCTION ACCORDING TO THE OPCODE BY THE
EXECUTION CIRCUIT OF THE HARDWARE PROCESSOR 1206
```

FIG. 12

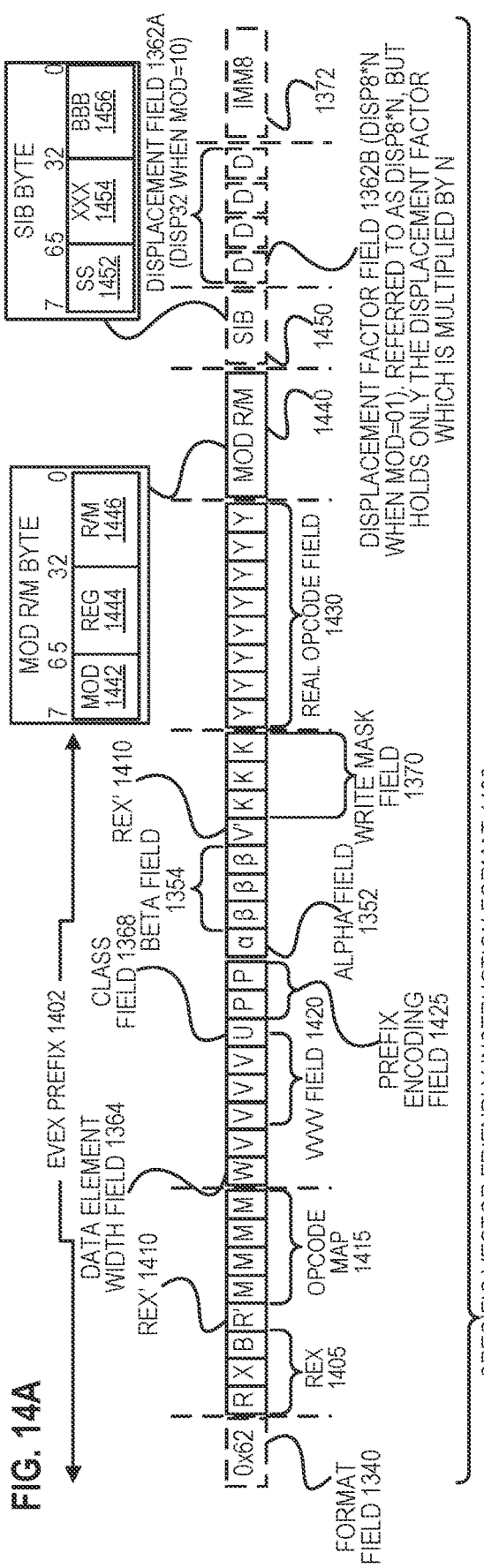
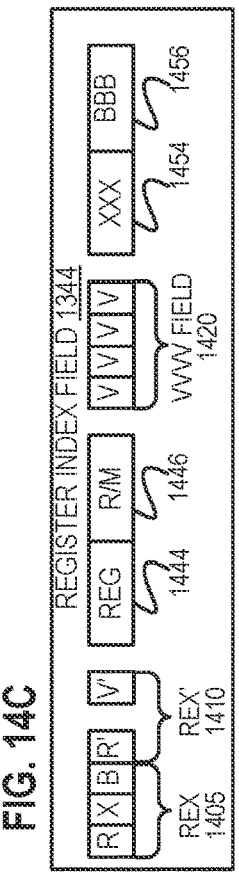
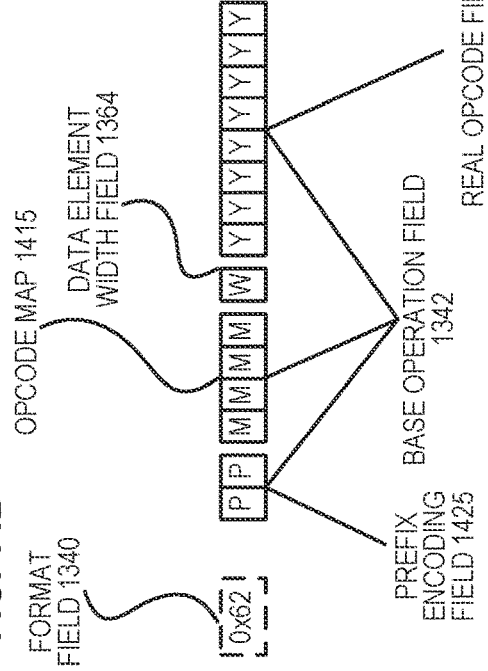
FIG. 14A
FIG. 14B
FIG. 14C

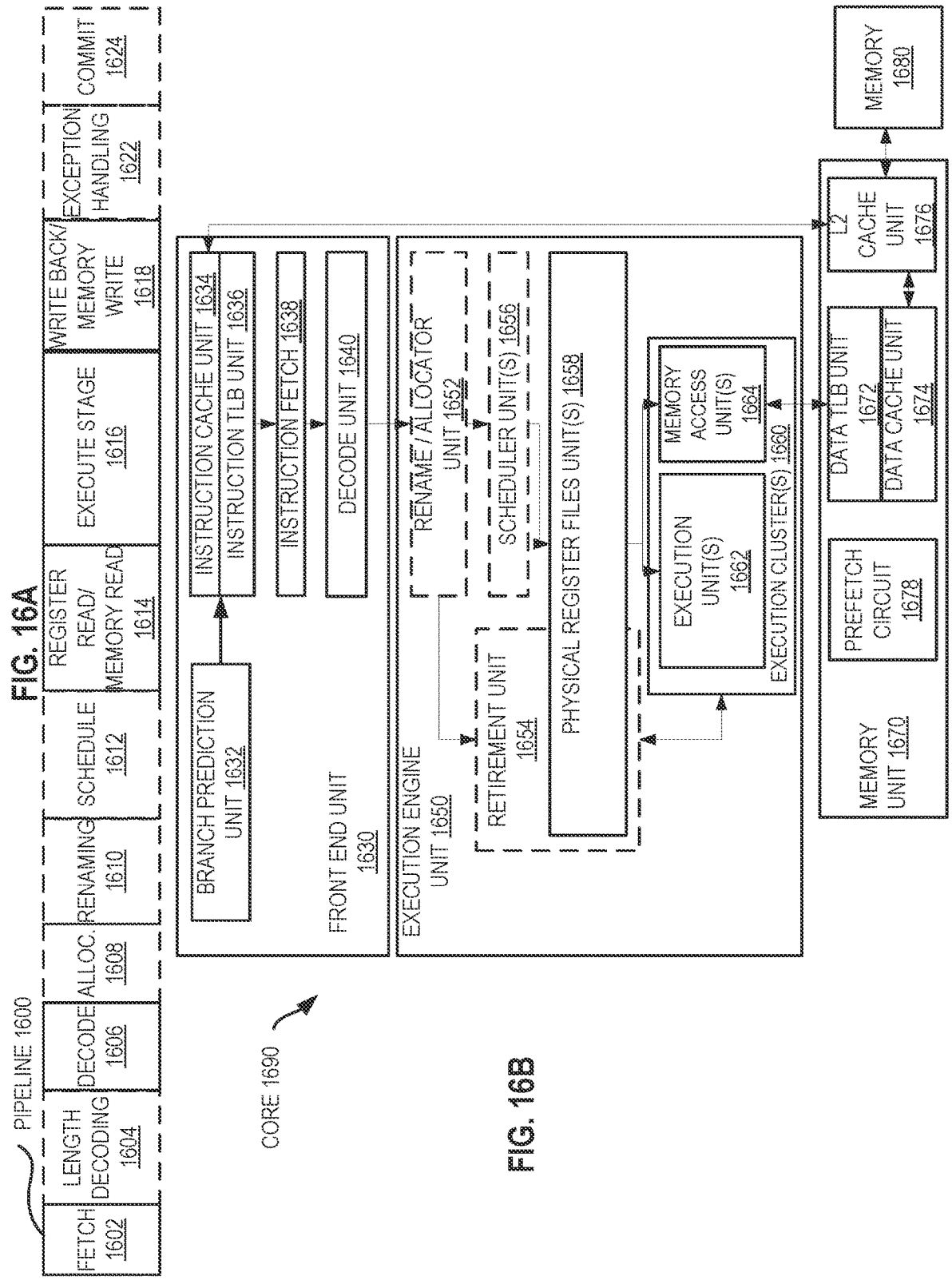

```
INCREMENT COUNTER ON OCCURRENCE OF AEX
                  2610
                    ↓
GENERATE ERROR IF NUMBER OF AEX OCCURRENCES
              EXCEED THRESHOLD
                  2615
```

```
void sensitive_crypto(void) {
  do {
    AEX_COUNTER = 0;

key_generation();

} while (AEX_COUNTER > THRESHOLD);
}
```

TECHNIQUES AND TECHNOLOGIES TO ADDRESS MALICIOUS SINGLE-STEPPING AND ZERO-STEPPING OF TRUSTED EXECUTION ENVIRONMENTS

TECHNICAL FIELD

The disclosure relates generally to electronics, and, more specifically, an embodiment of the disclosure relates to techniques and technologies to address malicious single-stepping and zero-stepping of trusted execution environments (TEEs).

BACKGROUND

Trusted Execution Environments (TEEs), such as Intel® Software Guard Extensions (Intel® SGX), are susceptible to methods that induce interrupts or exceptions to maliciously single-step (e.g. SGX-Step) or zero-step instruction processing in the TEE (e.g. Microscope replay attack, PLATYPUS power side-channel attack). During single-stepping or zero-stepping, a malicious hypervisor or operating system (OS) may be able to increase the granularity of side channel information which can be collected during the TEE processing. Analyzing side channel information is a method that can be used to infer information, such as instruction flows and data, about the TEE. Thus, there is value in techniques that can mitigate these attack techniques, specifically single-stepping and zero-stepping of TEEs.

BRIEF DESCRIPTION OF THE DRAWINGS

The present disclosure is illustrated by way of example and not limitation in the figures of the accompanying drawings, in which like references indicate similar elements and in which:

FIG. 2 illustrates example fields of a thread control structure of an enclave according to embodiments of the disclosure.

FIG. 12 is a flow diagram illustrating operations of another method for processing an "ERESUME" instruction according to embodiments of the disclosure.

FIG. 14A is a block diagram illustrating fields for the generic vector friendly instruction formats in FIGS. 13A and 13B according to embodiments of the disclosure.

FIG. 14B is a block diagram illustrating the fields of the specific vector friendly instruction format in FIG. 14A that make up a full opcode field according to one embodiment of the disclosure.

FIG. 14C is a block diagram illustrating the fields of the specific vector friendly instruction format in FIG. 14A that make up a register index field according to one embodiment of the disclosure.

FIG. 16A is a block diagram illustrating both an exemplary in-order pipeline and an exemplary register renaming, out-of-order issue/execution pipeline according to embodiments of the disclosure.

FIG. 16B is a block diagram illustrating both an exemplary embodiment of an in-order architecture core and an exemplary register renaming, out-of-order issue/execution architecture core to be included in a processor according to embodiments of the disclosure.

FIG. 26 is a flow diagram illustrating operations in a method for counting the number of AEX during TEE execution in accordance with one embodiment of the present disclosure.

FIG. 27 is a segment of pseudo-code illustrating operations in a method for counting the number of AEX during TEE execution in accordance with one embodiment of the present disclosure.

DETAILED DESCRIPTION

Figure 1:
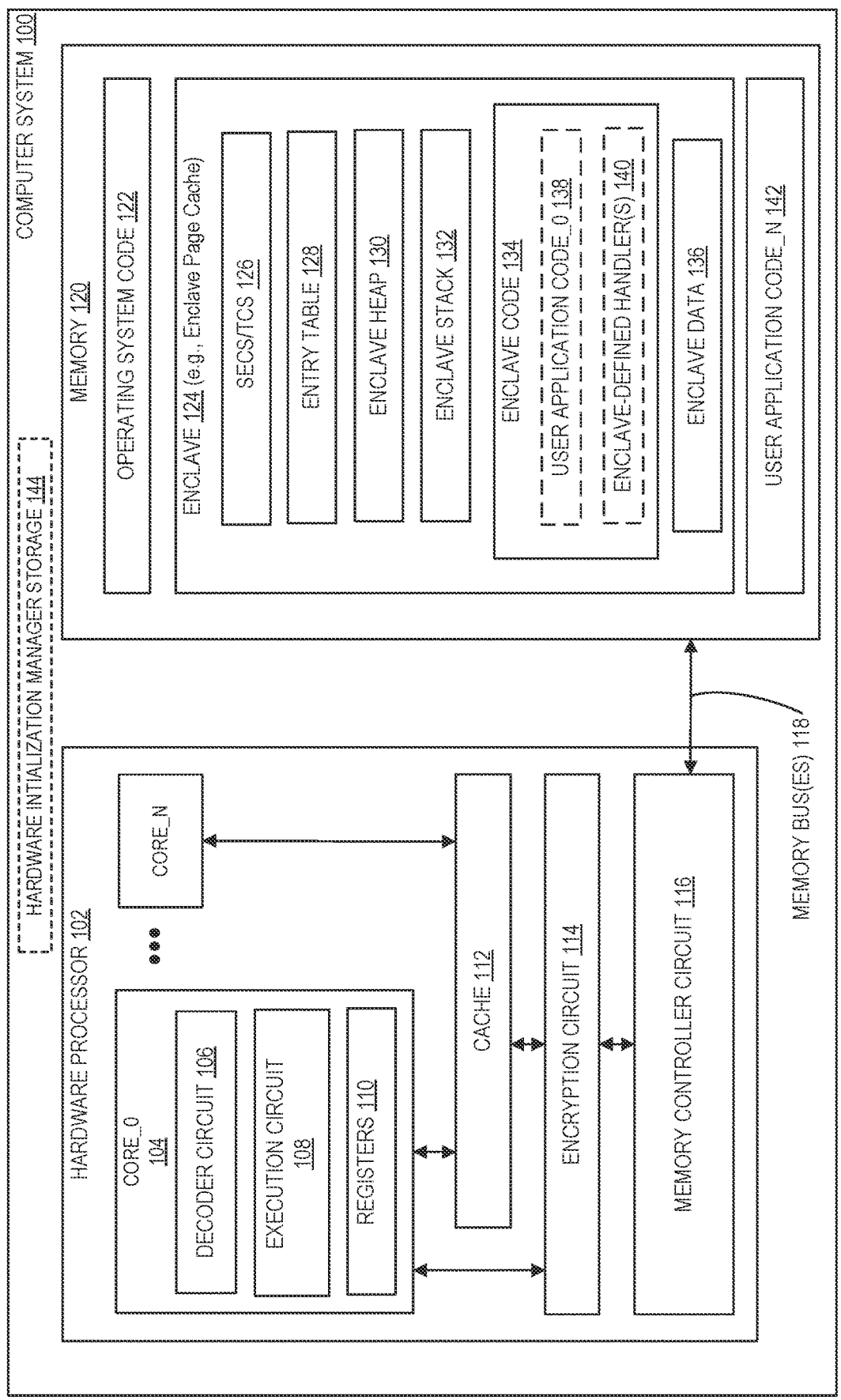
FIG. 1 illustrates a hardware processor coupled to a memory having an enclave according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software (e.g., a user application) may request an operation and a hardware processor (e.g., a core or cores thereof) may perform the operation in response to the request.

In certain embodiments, it is the responsibility of privileged system software (for example, an operating system (OS) and/or virtual machine monitor (VMM) (e.g., hypervisor)) to receive and handle software interrupts and (e.g., software and/or hardware) exceptions. An example exception is an undefined fault (#UD), e.g., caused by dividing by zero.

However, there are also several practical scenarios where unprivileged user-space software may instead intercept and handle these events. For example, an OS may allow user-level software (e.g., an application) to register a user-space handler (e.g., function) to be invoked by the OS if a specified event (e.g., signal) is sent to the process. In certain embodiments herein, the term "signal" refers to a software abstraction for either a hardware-triggered or software-triggered event. One non-limiting example of a software-triggered event is a user-level interrupt request, e.g., a SIGINT signal. One non-limiting example of a hardware-triggered event is an illegal opcode exception thrown by the processor (e.g., by a logical central processing unit (CPU) thereof), e.g., an illegal instruction (SIGILL) signal.

Certain processors support a trusted execution environment, for example, by implementing an architecturally protected execution environment. In certain embodiments, a trusted execution environment uses one or more protected containers in memory, e.g., one or more architecturally protected enclaves. In certain embodiments, an instruction set architecture (ISA) (for example, an extension(s) of an ISA, e.g., Intel® Software Guard Extensions (Intel® SGX)) includes a set of instructions and mechanisms for memory accesses to a processor. For example, where a first set of instruction extensions (e.g., SGX1) allows an application to instantiate a protected container (e.g., an enclave). In one embodiment, an enclave is a protected area in the application's address space, e.g., which provides confidentiality and integrity even in the presence of privileged malware. In certain embodiments, accesses to the enclave (e.g., its memory area) from any software not resident in the enclave are prevented. For example, where a second set of instruction extensions (e.g., SGX2) allows additional flexibility in runtime management of enclave resources and thread execution within an enclave.

Asynchronous and synchronous events, such as exceptions, interrupts, traps, SMIs, and VM exits may occur while executing inside an enclave. These events may be referred to as Enclave Exiting Events (EEE). In certain embodiments, upon an EEE, the processor state is securely saved inside the enclave (e.g., in the thread's current SSA frame) and may then be replaced by a synthetic state to prevent leakage of secrets. The process of securely saving state (e.g., and establishing the synthetic state) may be referred to as an asynchronous enclave exit (AEX). As part of certain EEEs, the asynchronous exit pointer (AEP) is pushed onto the stack as the location of the eventing address, e.g., this is the location where control will return to after executing the IRET. The ERESUME instruction (e.g., leaf function) can be executed from that point to reenter the enclave and resume execution from the interrupted point. In certain embodiments, after an AEX has completed, the logical processor is no longer in enclave mode and the exiting event is processed normally. In certain embodiments, any new events that occur after the AEX has completed are treated as having occurred outside the enclave (e.g. a page fault (#PF) in dispatching to an interrupt handler).

In certain embodiments, an asynchronous enclave exit (AEX) is caused by certain (e.g., interrupt and/or exception) events while executing enclave code. Code executing in an enclave may need to handle certain events, e.g., "signals" as discussed herein. However, certain enclave threat models make this more difficult, for example, where the OS cannot be trusted to deliver signals to the enclave because the OS cannot be trusted in general (e.g., the OS is assumed to be malicious). Hence, in certain embodiments the OS may either (a) deliver invalid signals to the enclave or (b) choose not to deliver valid notifications to the enclave. Embodiments herein provide a solution to (a) and (b), e.g., without inducing a substantial performance overhead and/or without requiring a cumbersome refactoring effort for enclave application/library code.

Another emerging area of research is controlled-channel attacks and transient execution attacks against TEEs. Certain of these attacks utilize an untrusted OS/VMM to precisely arm an interrupt controller (e.g., an advanced programmable interrupt controller (APIC)) to interrupt enclave execution after a single instruction has been executed, thus "single-stepping" through the code in a TEE. This technique may also be used in a cache-based attacks by de-noising side channels. Certain enclaves may be not be able to mitigate these attacks, e.g., where the enclave(s) cannot detect or react to interrupts and/or exceptions caused by a malicious OS/VMM.

Embodiments herein provide a mechanism to allow trusted execution environments (TEEs) to react to asynchronous exits (e.g., caused by interrupts and/or exceptions), e.g., by enabling return-to-handler (RTH) functionality. Embodiments herein provide a hardware-based solution that addresses two problems: (1) the efficient handling of "signals" and (2) allowing TEE software to deploy customizable security policies to mitigate interrupt-driven attacks, e.g., including those that depend on a "single-stepping" technique.

FIG. 1 illustrates a hardware processor 102 coupled to a memory 120 having an enclave 124 according to embodiments of the disclosure. A core may be any hardware processor core, e.g., as an instance of core 16B in FIG. 16B. Although multiple cores are shown, hardware processor 102 (e.g., socket) may have a single or any plurality of cores (e.g., where N is any positive integer greater than 1). Depicted core 104 includes a decoder circuit 106 to decode instructions into decoded instructions and an execution circuit 108 to execute instructions, e.g., to operate on data in registers 110.

Memory access (e.g., store or load) request may be generated by a core, e.g., a memory access request may be generated by execution circuit 108 of core 104 (e.g., caused by the execution of an instruction decoded by decoder circuit 106). In certain embodiments, a memory access request is serviced by a cache, e.g., one or more levels of cache 112 in hardware processor 102. Additionally or alternatively (e.g., for a cache miss), memory access request may be serviced by memory separate from a cache, e.g., but not a disk drive.

In certain embodiments, computer system 100 includes an encryption circuit 114 (e.g., that utilizes location independent persistent memory encryption as disclosed herein). In one embodiment, encryption circuit 114 of hardware processor 102 receives a memory access (e.g., store or load) request from one or more of its cores (e.g., from an address generation circuit of execution circuit 108). Encryption circuit may, e.g., for an input of a destination address and text to be encrypted (e.g., plaintext) (e.g., and a key), perform an encryption to generate a ciphertext (e.g., encrypted data). The ciphertext may then be stored in storage, e.g., in memory 120. An encryption circuit may perform a decryption operation, e.g., for a memory load request.

In certain embodiments, computer system 100 includes a memory controller circuit. In one embodiment, memory controller circuit 116 of hardware processor 102 receives an address for a memory access request, e.g., and for a store request also receiving the payload data (e.g., ciphertext) to be stored at the address, and then performs the corresponding access into memory 120, e.g., via one or more memory buses 118. Computer system 100 may also include a coupling to secondary (e.g., external) memory (e.g., not directly accessible by a processor), for example, a disk (or solid state) drive (e.g., data storage 2028 in FIG. 20).

In one embodiment, the hardware initialization manager (non-transitory) storage 144 stores hardware initialization manager firmware (e.g., or software). In one embodiment, the hardware initialization manager (non-transitory) storage 144 stores Basic Input/Output System (BIOS) firmware. In another embodiment, the hardware initialization manager (non-transitory) storage 144 stores Unified Extensible Firmware Interface (UEFI) firmware. In certain embodiments (e.g., triggered by the power-on or reboot of a processor), computer system 100 (e.g., core 104) executes the hardware initialization manager firmware (e.g., or software) stored in hardware initialization manager (non-transitory) storage 144 to initialize the system 100 for operation, for example, to begin executing an operating system (OS), initialize and test the (e.g., hardware) components of system 100, and/or enabling enclave functionality (e.g., enclave instructions) (e.g., enabling by setting a corresponding field in a control register (e.g., model-specific register (MSR)) of registers 110, e.g., IA32_FEATURE_CONTROL MSR).

Memory 120 may store operating system (OS) code 122 (e.g., supervisor level code, e.g., current privilege level (CPL)=0). For example, with the current privilege level stored in a current privilege level (CPL) field of a code segment selector register of segment register of registers 110. Memory 120 may store user application code (e.g., user code_0 138 to user code_N 142) (e.g., user level code, e.g., CPL>0). However, in certain embodiments it is desirable to store user application code (e.g., user code_0 138) within an enclave 124.

Enclave 124 may include a secure enclave control structure (SECS) (e.g., with one SECS per enclave) and/or thread control structure (TCS) 126 (e.g., one TCS for each thread), an entry table 128, an enclave heap 130, an enclave stack 132, enclave code 134 (e.g., user application code_0 138 (e.g., a user application) and/or an enclave defined handler 140), enclave data 136 (e.g., to store encrypted data used by user application code_0 128), or any one or combination thereof. In certain embodiments, a SECS contains meta-data about the enclave which is used by the hardware and cannot be directly accessed by software. For example, a SECS including a field that stores the enclave build measurement value (e.g., MRENCLAVE). In one embodiment, that field is initialized by executing an enclave create (ECREATE) instruction, e.g., and updated by every enclave add (EADD) instruction and enclave extend (EEXTEND) instruction and/ or locked by an enclave initialize (EINIT) instruction. In certain embodiments, every enclave contains one or more TCS structures, e.g., per thread of the enclave. For example, with a TCS containing meta-data used by the hardware to save and restore thread specific information when entering/ exiting the enclave. In one embodiment, there is only one field (e.g., FLAGS) of a TCS that may be accessed by software (e.g., where this field can only be accessed by debug enclaves). In one embodiment, a flag bit (e.g., DBGOPTIN) allows a single step into the thread associated with the TCS. In certain embodiments, a SECS is created when an ECREATE instruction is executed. In certain embodiments, a TCS can be created using an EADD instruction and/or an (e.g., SGX2) instruction.

An enclave 124 may include one or more pages of an enclave page cache (EPC), e.g., where the EPC is the secure storage used to store enclave pages when they are a part of an executing enclave. In certain embodiments, for an EPC page, hardware performs additional access control checks to restrict access to the page, e.g., after the current page access checks and translations are performed, the hardware checks that the EPC page is accessible to the program currently executing. In one embodiment, generally an EPC page is only accessed by the owner of the executing enclave or an instruction which is setting up an EPC page. In certain embodiments, an EPC is divided into EPC pages, e.g., where an EPC page is 4 KB in size and always aligned on a 4 KB boundary. In certain embodiments, pages in the EPC can either be valid or invalid, e.g., where every valid page in the EPC belongs to one enclave instance. In certain embodiments, the EPC is managed by privileged software (e.g., OS or VMM). Certain embodiments herein of an ISA a set of instructions for adding and removing content to and from the EPC. The EPC may be configured by hardware initialization manager at boot time. In one implementation in which EPC memory is part of system memory (e.g., dynamic random access memory (DRAM)), the contents of the EPC are protected by encryption circuit 114.

Enclave instructions may include supervisor-level instructions and user-level instructions.

For example, one or more supervisor-level instructions of: an enclave add (EADD) instruction to add an EPC page to an enclave, an enclave block (EBLOCK) instruction to block an EPC page, an enclave create (ECREATE) instruction to create an enclave, a debug enclave read (EDBGRD) instruction to read data from a debug enclave by a debugger, a debug enclave write (EDBGWR) instruction to read data from a debug enclave by a debugger, an enclave extend (EEXTEND) instruction to extend an EPC page measurement, an enclave initialize (EINIT) instruction to initialize an enclave, an enclave load blocked (ELDB) instruction to load an EPC page in a blocked state, an enclave load unblocked (ELDU) instruction to load an EPC page in an unblocked state, an enclave PA (EPA) instruction to add an EPC page to create a version array, an enclave remove (EREMOVE) instruction to remove an EPC page from an enclave, an enclave track (ETRACK) instruction to activate enclave block (EBLOCK) checks, or an enclave write back/invalidate (EWB) instruction to write back and invalidate an EPC page.

For example, one or more user-level instructions of: an enclave enter (EENTER) instruction to enter an enclave, an enclave exit (EEXIT) instruction to exit an enclave, an enclave key (EKEY) instruction to create a cryptographic key, an enclave report (EREPORT) instruction to create a cryptographic report, or an enclave resume (ERESUME) instruction to re-enter an enclave.

In certain embodiments, each executing thread in the enclave is associated with a thread control structure 126 (TCS), e.g., with each TCS having a 4K-Bytes alignment.

FIG. 2 illustrates example fields of a thread control structure 126 of an enclave according to embodiments of the disclosure. Certain embodiments herein utilize one or more fields (e.g., FLAGS field 202, current state save area (CSSA) field 204, RTH_REDZONESIZE field 206, and/or HANDLER field 208) to implement return-to-handler (RTH) functionality. This are discussed further below. In certain embodiments, one or more fields are within a secure enclave control structure (SECS) (e.g., RTH_REDZONESIZE field 206) and/or are within a thread control structure (TCS).

Certain events, such as exceptions and interrupts, incident to (e.g., but asynchronous with) enclave execution may cause control to transition outside of enclave mode. (e.g., while also causing a change of privilege level.) To protect the integrity and security of the enclave, certain processors will exit the enclave (e.g., and enclave mode) before invoking the handler for such an event. For that reason, such events may be called enclave-exiting events (EEE), e.g., with EEEs including external interrupts, non-maskable interrupts, system-management interrupts, exceptions, and virtual machine (VM) exits. The process of leaving an enclave in response to an EEE may be referred to as an asynchronous enclave exit (AEX). To protect the secrecy of the enclave, in certain embodiments an AEX saves the state of certain registers within enclave memory (e.g., state save area (SSA)) and then loads those registers with fixed values (e.g., called synthetic state). In certain embodiments, the state save area holds the processor state at the time of an AEX. To allow handling events within the enclave and re-entering it after an AEX, in certain embodiments the SSA is a stack of multiple SSA frames, e.g., as shown in FIG. 3.

Figure 3:
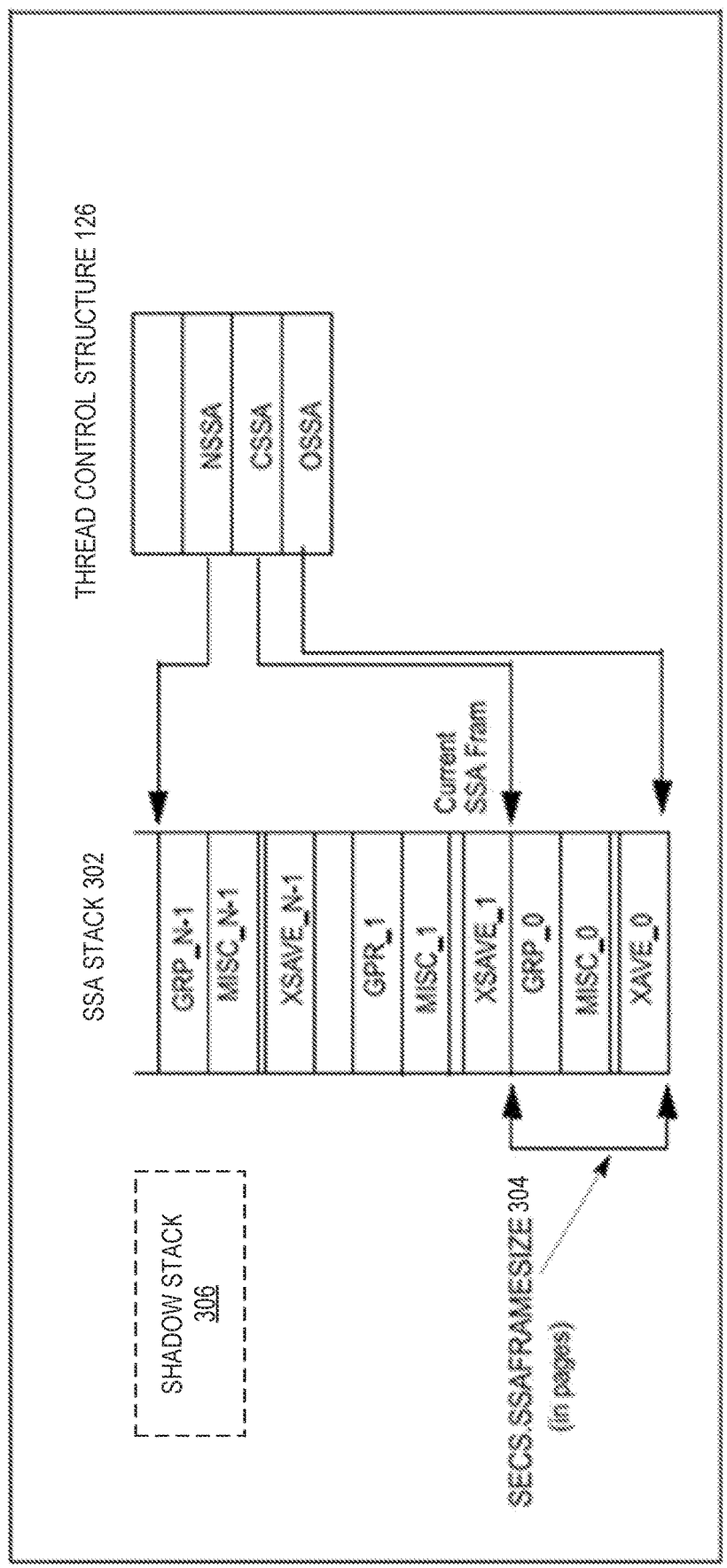
FIG. 3 illustrates a thread control structure and SSA stack according to embodiments of the disclosure.

FIG. 3 illustrates a thread control structure 126 and state save area (SSA) stack 302 according to embodiments of the disclosure. In one embodiment, (optionally) a shadow stack 306 is included to store a copy of the SSA stack 302. In certain embodiments, the size of a frame in the State Save Area (SECS.SSAFRAMESIZE 304) defines the number of (e.g., 4K Byte) pages in a single frame in the State Save Area. In certain embodiments, the SSA frame size is large enough to hold the general purpose register (GPR) state, the extended processor (XSAVE) state, and any miscellaneous state. In certain embodiments, a secure enclave control structure (SECS) includes a base address of the enclave (SECS.BASEADDR), e.g., this defines the enclave's base linear address from which the offset to the base of the SSA stack is calculated. In certain embodiments, number of state save area slots (TCS.NSSA) defines the total number of slots (frames) in the State Save Area stack. In certain embodiments, the current state save area slot (TCS.CSSA) defines the slot to use on the next exit. In certain embodiments, the State Save Area (TCS.OSSA) defines the offset of the base address of a set of State Save Area slots from the enclave's base address.

In certain embodiments, when an AEX occurs, hardware selects the SSA frame to use by examining TCS.CSSA, e.g., with the processor state saved into the SSA frame (e.g., and loaded with a synthetic state) to avoid leaking secrets, return stack pointer (RSP) and return pointer (RP) are restored to their values prior to enclave entry, and TCS.CSSA is incremented.

As will be described later, if an exception takes the last slot, in certain embodiments it is not possible to reenter the enclave to handle the exception from within the enclave, for example, where a subsequent ERESUME instruction restores the processor state from the current SSA frame and frees the SSA frame. However, certain embodiments herein allow reentry to the enclave to handle the exception from within the enclave, e.g., via implementation of return-to-handler (RTH) functionality to ERESUME instruction as discussed herein.

In certain embodiments, an enclave entry must happen through specific enclave instructions (e.g., only EENTER or ERESUME) and/or an enclave exit must happen through specific enclave instructions or events (e.g., only EEXIT or asynchronous enclave exit (AEX)).

Figure 4:
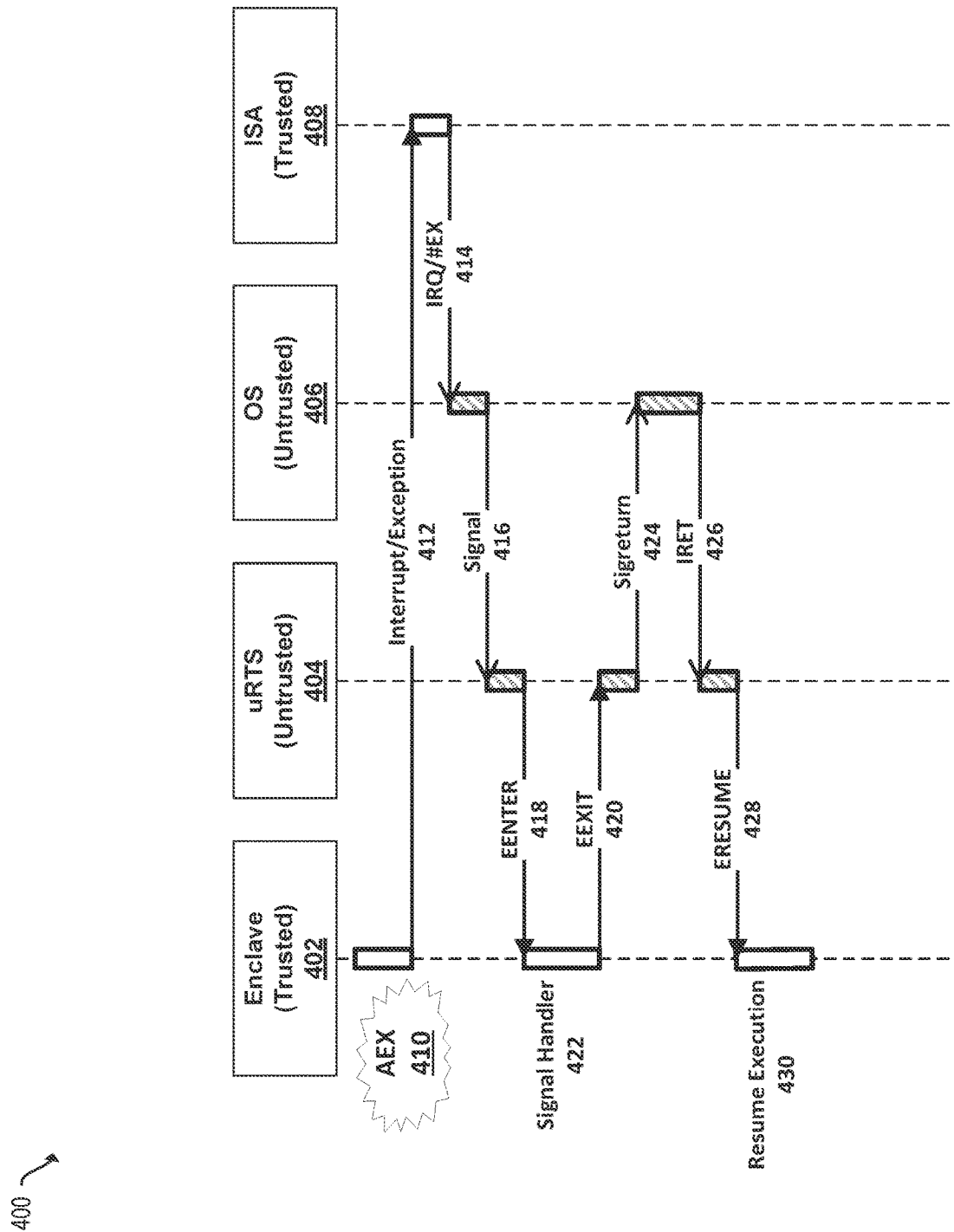
FIG. 4 illustrates a method of handling an asynchronous exit of the execution of code from an enclave that utilizes an enclave enter instruction, an enclave exit instruction, and an enclave resume instruction according to embodiments of the disclosure.

FIG. 4 illustrates a (e.g., swimlane diagram of a) method 400 of handling an asynchronous exit 410 (AEX) of the execution of code from an enclave 402 that utilizes an enclave enter instruction 418 (EENTER), an enclave exit instruction 420 (EEXIT), and an enclave resume instruction 428 (ERESUME) according to embodiments of the disclosure. In certain embodiments, enclave 402 is a trusted (e.g., for security purposes) execution environment (e.g., an architecturally protected enclave) for user code, untrusted (e.g., for security purposes) run-time system 404 (uRTS) is untrusted user code, operating system (OS) 406 is untrusted, and ISA 408 (e.g., processor) is trusted. In certain embodiments, a trusted execution environment exposes an application programming interface (API) handler (e.g., function) that allows an enclave 402 (e.g., enclave application) to register one or more exception (e.g., "signal") handlers with the trusted and untrusted run-time system (tRTS and uRTS, respectively). In one embodiment, if the uRTS does deliver a signal notification, it will do so by making a nested ECALL into the enclave exception handler, i.e., an EENTER (synchronously enter the enclave at a fixed entry point) followed by an EEXIT (synchronously exit the enclave). As its name implies, the uRTS cannot be trusted to reliably deliver signal notifications to the enclave, or to deliver signal notifications that are valid. For instance, the uRTS could send false signals to the enclave to try to influence its behavior.

One workaround is to require enclave signal handlers to make no assumptions about the nature, origin, or even existence of an incoming signal. For example, in reference to FIG. 4, suppose that enclave 402 wants to monitor for a particular hardware exception (#EX), with corresponding software signal SIGEX. In this example, if the enclave encounters #EX, then this will trigger an enclave asynchronous exit 410 (AEX) and the #EX exception 412 will be delivered to the untrusted OS 406, e.g., via interrupt request 414 (IRQ). If the OS chooses to deliver the SIGEX signal 416 to the uRTS, and if the uRTS chooses to deliver the signal to the enclave, it will do so by making a nested ECALL (i.e., EENTER 418 and EEXIT 420) into the registered exception handler 422. For example, with EEXIT 420 to uRTS 404 causing signal return 424 to OS 406, and the OS causing an interrupt return 426 (IRET), that causes execution of ERSUME instruction 428 to resume execution at 430 of the enclave 402.

However, even if the uRTS provides additional information about the signal 416, the uRTS and enclave (e.g., enclave application) are not to trust that information in certain embodiments. Instead, the enclave 402 can manually inspect the process state (e.g., GPRs, vector registers, etc.) that was saved on the state save area (SSA) on AEX. Specifically, it can examine the instruction pointed to by the saved RIP, and the state of the CPU registers when the exception occurred. For instance, if the enclave is anticipating a SIGILL caused by a CPUID invocation (e.g., where CPUID triggers undefined (#UD) in enclave mode), it can observe whether RIP pointed to a CPUID opcode.

In certain embodiments, a disadvantage of this is that handling each AEX (e.g., signal/exception) requires an additional EENTER and EEXIT. Such instruction may be computationally expensive, e.g., where EENTER or EEXIT each consumes thousands (e.g., more than 8000) of CPU cycles, e.g., more than 50 times greater than the context switching overhead for a single SYSCALL.

Figure 5:
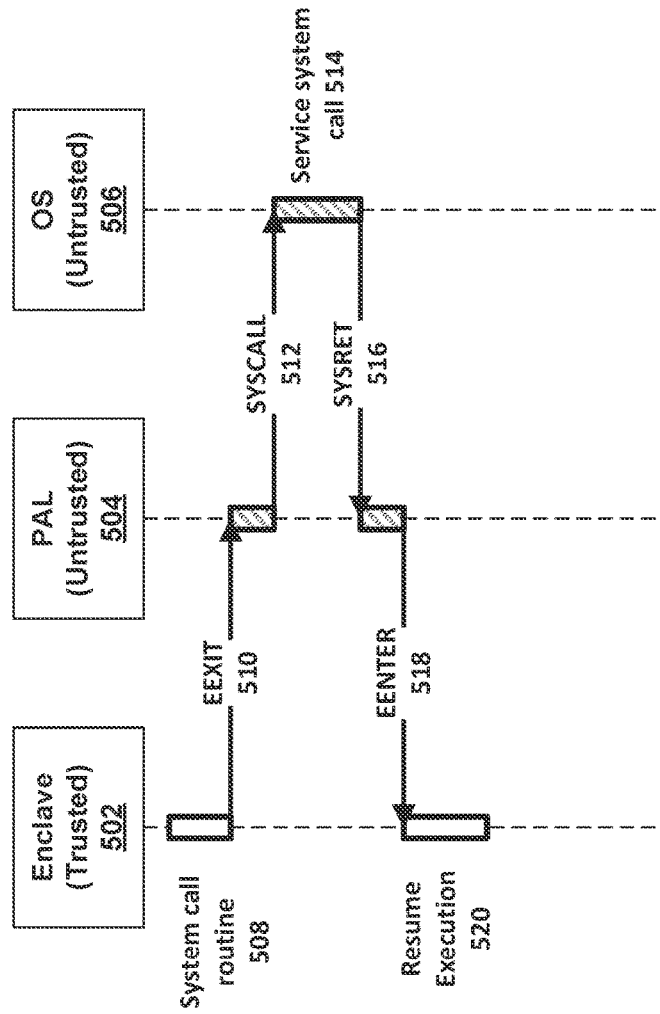
FIG. 5 illustrates a method of handling an exception from the execution of code from an enclave that utilizes an enclave exit instruction, a system call instruction, and an enclave enter instruction according to embodiments of the disclosure.

FIG. 5 illustrates a method 500 of handling an exception from the execution of code from an enclave 502 that utilizes an enclave exit instruction 510 (EEXIT), a system call instruction 512 (SYSCALL), and an enclave enter instruction 518 (EENTER) according to embodiments of the disclosure. In certain embodiments, enclave 502 is a trusted (e.g., for security purposes) execution environment (e.g., an architecturally protected enclave) for user code, untrusted (e.g., for security purposes) platform abstraction layer 504 (uRTS) is untrusted, and operating system (OS) 506.

In certain embodiments, enclave 502 (e.g., code) is refactored so that exceptions are less likely to be triggered, for example, to allow legacy applications to be executed inside of an enclave without additional modifications. One challenge in designing such a framework is the use of legacy libraries (e.g., a standard C programming library "libc") that make extensive use of instructions that are not allowed within enclave mode. One example of such an instruction is a system call (SYSCALL) instruction, e.g., that when executed is to invoke an OS system-call handler at privilege level 0. As shown in FIG. 5, shared libraries may be refactored so that any instruction that would trigger an exception (e.g., undefined (#UD)) in enclave mode is replaced by an appropriate OCALL (e.g., EEXIT 510 followed by EENTER 518) to provide semantically equivalent behavior. For example, with system call routine 508 causing EEXIT 510, which causes system call (SYSCALL) 512 to OS 506 that services the system call at 514, then executes a system return (SYSRET) 516, which causes execution of EENTER 518 to enter enclave 502 and resume execution at 520.

In certain embodiments, a disadvantage of this is that a large amount of code may need to be refactored or rewritten to avoid triggering exceptions within an enclave.

In one embodiment, a feature is added to selectively disable the ERESUME instruction. Therefore, if the uRTS would like to resume the enclave following an AEX, the uRTS is to instead EENTER the enclave, thus triggering a software AEX handler. The handler can deploy mitigations if necessary, re-enable ERESUME, and then EEXIT. However, this is inefficient, as it may require an additional EENTER and EEXIT every time the enclave is asynchronously interrupted.

In one embodiment, ERESUME is dynamically mutated into EENTER, thereby also allowing enclave exiting events to be handled by enclave software. However, this is inefficient, as it may require an additional EEXIT and EENTER (e.g., in that order) every time the enclave is asynchronously interrupted.

In one embodiment, hardware transactional memory (e.g., Intel® TSX) is used to detect interrupts and exceptions, but it requires enclave code to be decomposed into TSX transactions, which can have a substantial (e.g., about 50%) performance overhead.

By contrast, certain embodiments herein modify an enclave resume instruction to add return-to-handler (RTH) functionality to the enclave resume instruction. Embodiments herein reduce the number of context switches required for a (user) enclave thread to handle a "signal" (e.g., that caused an asynchronous exit). Embodiments herein provide a new instruction that supports a new software model to efficiently handle signals and react to arbitrary enclave exiting events (e.g., that trigger an AEX). For example, a new ERESUME instruction that, in addition to resuming execution of code from an enclave, adds return-to-handler (RTH) functionality to handle "signals" and enclave exiting events within an enclave, e.g., and without the need for a nested ECALL. In one embodiment, after a software thread running within an enclave has been suspended by an interrupt or exception and then the thread is resumed and issues an ERESUME instruction to return into the enclave, an enclave-defined (e.g., AEX) handler will be invoked. The thread can use this event handler to, for instance, react to an exception or deploy mitigations against various attacks. Embodiments herein provide an ISA extension to allow (e.g., software developers) to further reduce signal handling overhead by preventing a subset of exceptions from trapping into the OS (e.g., and without triggering an AEX in enclave mode), for example to allow (user) enclave threads to handle exceptions directly and without any kind of kernel/enclave context switch.

In certain embodiments, one of the greatest caveats of deploying software in an enclave is the performance overhead. Specifically, context switching to/from enclave mode may be far more expensive (e.g., 50 times greater) than context switching to/from OS (e.g., kernel) mode. Embodiments herein reduce the computational overhead observed when servicing signals and exceptions from within an enclave by reducing the number of required context switches.

In certain embodiments, an obstacle to deploying legacy software in enclaves is the requirement to refactor code that invokes instructions that are illegal in enclave mode, e.g., SYSCALL and CPUID, among many others. Certain parties (e.g., independent software vendors) may not want to maintain separate codebases for enclave and non-enclave versions of the same software, thus embodiments herein allow legacy software to invoke these heretofore forbidden instructions without incurring unnecessary overhead, e.g., instead of trapping to the OS and forcing an enclave exit, such an instruction can be handled directly and efficiently by the enclave (e.g., trusted runtime system). Embodiments herein provide increased security, e.g., by mitigating attacks that rely on frequently interrupting a TEE.

Certain embodiments herein modify the behavior of TEE resumption (e.g., the ERESUME instruction for enclaves) to elide nested ECALLs for exception handling and/or elide OCALLs that are used to implement functionality that is prohibited within an enclaves. Embodiments here can be used by enclave code (e.g., enclave software) to detect when an AEX occurs and deploy reactive mitigations against side-channel attacks. When the enclave is resumed (e.g., via ERESUME), certain embodiments herein allow execution to begin at the (e.g., signal/AEX) handler, e.g., after the signal/AEX has been handled, execution of the code in the enclave can resume at the point where the enclave exiting event had occurred.

Figure 6:
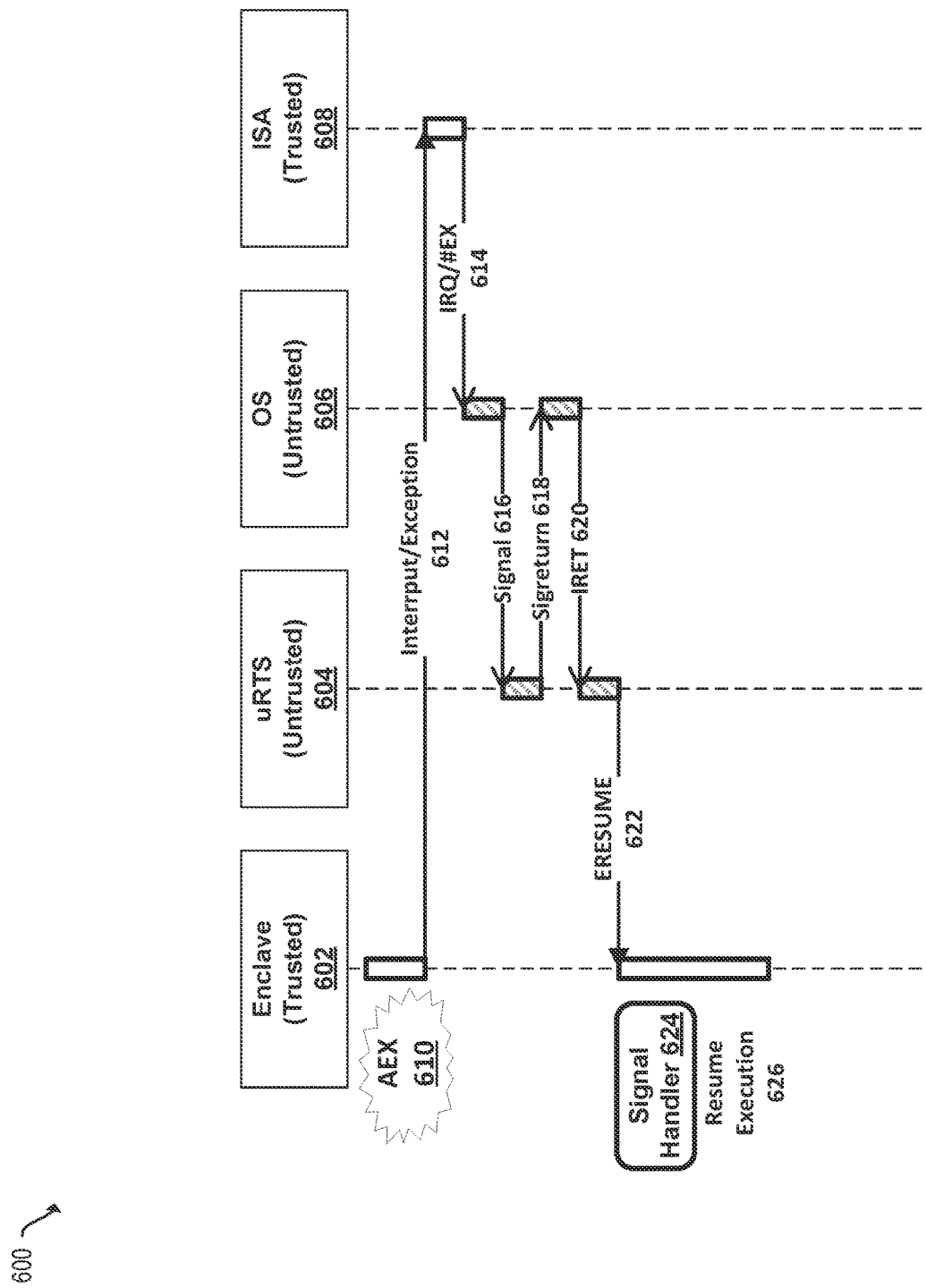
FIG. 6 illustrates a method of handling an asynchronous exit of the execution of code from an enclave that utilizes an enclave resume instruction that invokes a handler to handle an operating system signal caused by the asynchronous exit and then resumes execution of the code from the enclave according to embodiments of the disclosure.

FIG. 6 illustrates a method of handling an asynchronous exit 610 (AEX) of the execution of code from an enclave 602 that utilizes an enclave resume instruction 622 (ERESUME) that invokes a handler 624 to handle an operating system signal caused by the asynchronous exit and then resumes execution of the code from the enclave according to embodiments of the disclosure. In certain embodiments, enclave 602 is a trusted (e.g., for security purposes) execution environment (e.g., an architecturally protected enclave) for user code, untrusted (e.g., for security purposes) run-time system 604 (uRTS) is untrusted user code, operating system (OS) 606 is untrusted, and ISA 608 (e.g., processor) is trusted. FIG. 6 illustrates how an ERESUME instruction according to this disclosure can be used to handle signals more efficiently, e.g., without requiring a nested ECALL as compared with FIG. 4).

In certain embodiments, when an event (e.g., interrupt or exception 612) triggers an AEX 610, enclave execution is suspended, and control is transferred to the OS, e.g., via transmission of interrupt/exception 612 to ISA 608, which then transmits interrupt/exception 612 to the untrusted OS 606, e.g., via interrupt request 614 (IRQ) (e.g., identifying the particular interrupt/exception). The OS 606 may then choose to deliver an appropriate signal 616 to the uRTS 604, which in turn can decide whether to allow the enclave to handle the signal, and, if so, the uRTS 604 will unwind the exception by issuing a signal return 618 (Sigreturn) and eventually allowing control to return to the enclave, e.g., by causing signal return 618 to OS 606, and the OS causing an interrupt return 620 (IRET), that causes execution of ERESUME (with return-to-handler (RTH) functionality) instruction 622 to cause (i) invocation of (e.g., signal) handler 624 and (ii) then resumption of execution at 626 of the enclave 602.

In one embodiment, immediately following ERESUME 622, the enclave 602 is notified that an AEX 610 had occurred, and enclave 602 (e.g., via its handler 624) can respond by handling the signal (e.g., to take an action to remove the trigger of the interrupt/exception). After the signal has been processed, the enclave 602 thread resumes execution where the AEX 610 had occurred in certain embodiments. Note that this approach uses only two enclave operations (i.e., AEX and ERESUME) in contrast to an enclave exception handling model that additionally requires entry into the enclave via EENTER to handle the exception followed by an EEXIT (see, e.g., FIG. 4).

Figure 7:
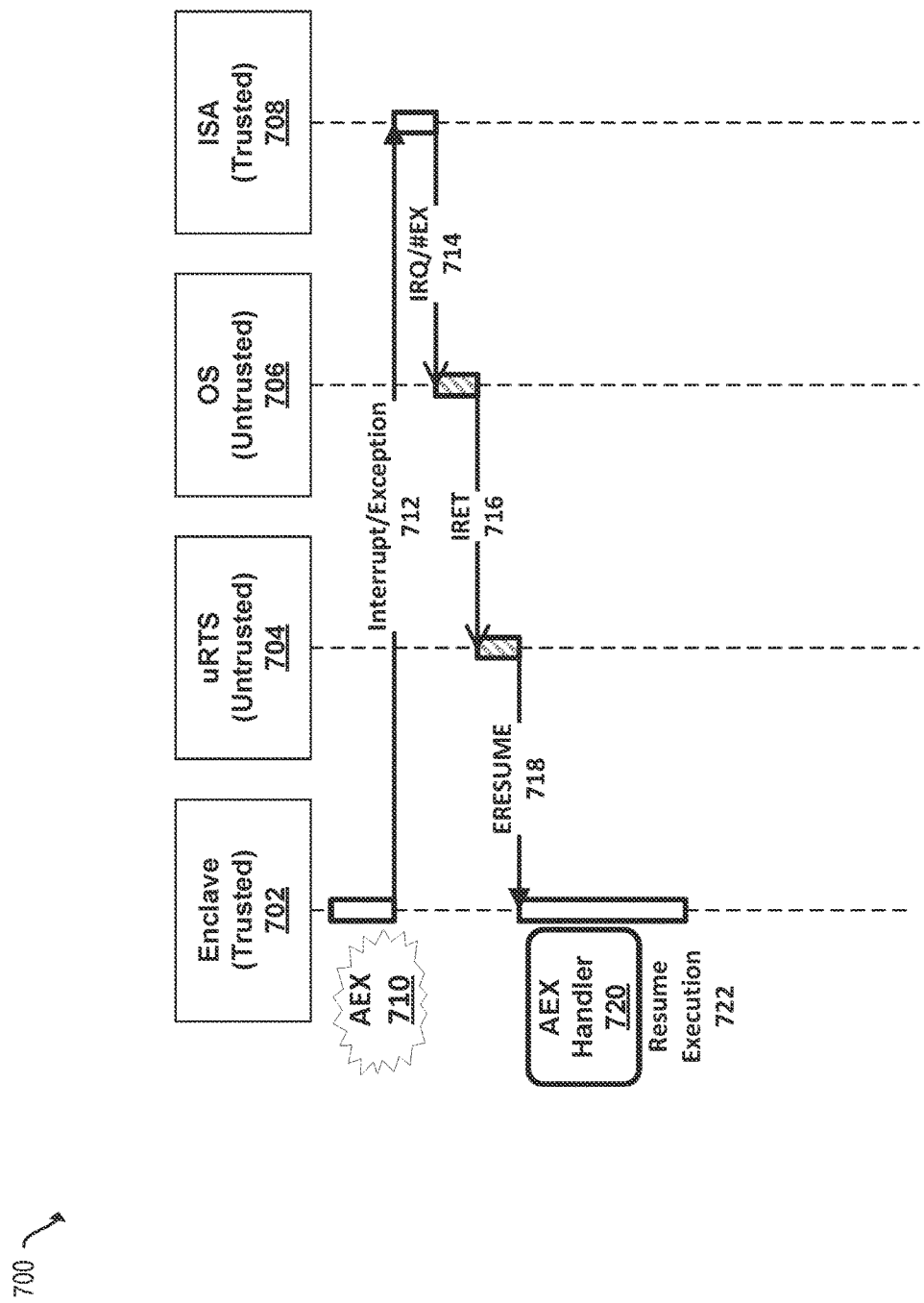
FIG. 7 illustrates a method of handling an asynchronous exit of the execution of code from an enclave that utilizes an enclave resume instruction that invokes a handler that is notified that the asynchronous exit has occurred (e.g., to cause deployment of one or more mitigations against a side-channel attack) and then resumes execution of the code from the enclave according to embodiments of the disclosure.

FIG. 7 illustrates a method of handling an asynchronous exit 710 (AEX) of the execution of code from an enclave 702 that utilizes an enclave resume instruction that invokes a handler that is notified that the asynchronous exit has occurred (e.g., to cause deployment of one or more mitigations against a side-channel attack) and then resumes execution of the code from the enclave according to embodiments of the disclosure. In certain embodiments, enclave 702 is a trusted (e.g., for security purposes) execution environment (e.g., an architecturally protected enclave) for user code, untrusted (e.g., for security purposes) run-time system 704 (uRTS) is untrusted user code, operating system (OS) 706 is untrusted, and ISA 708 (e.g., processor) is trusted. FIG. 7 illustrates how an ERESUME instruction according to this disclosure can be used where the enclave is not expected to handle a particular signal (e.g., that causes an AEX), but may still want to be notified that an AEX had occurred, e.g., to deploy mitigations against side-channel attacks. As one example, an AEX handler 720 makes dummy accesses to enclave code pages to set their access ("A") and dirty ("D") bits to confuse an attacker, e.g., to confuse a technique which uses these bits to detect which instructions and data the enclave is using. Note that a single software function can be used to handle signals and deploy mitigations in certain embodiments.

In one embodiment, each TCS will have a single (e.g., AEX) handler, for example, and that handler could be used either to handle signals or mitigate attacks, or both. For example, in both FIGS. 6 and 7 the handler that is invoked may be the TCS's lone handler 208, e.g., where in FIG. 6, the handler 208 is used to handle a signal and in FIG. 7, the handler 208 is used to mitigate (e.g., potential) attacks. In certain embodiments, a single AEX handler may perform (i)

the handling of a signal (e.g., as in FIG. 6) or (ii) the mitigation of (e.g., potential) attack(s) (e.g., as in FIG. 7).

In certain embodiments, when an event (e.g., interrupt or exception 712) triggers an AEX 710, enclave execution is suspended, and control is transferred to the OS, e.g., via transmission of interrupt/exception 712 to ISA 708, which then transmits interrupt/exception 712 to the untrusted OS 706, e.g., via interrupt request 714 (IRQ) (e.g., identifying the particular interrupt/exception). The OS 706 may then service the signal that causes the AEX 710 and then allow control to return to the enclave, e.g., by OS 706 causing an interrupt return 716 (IRET), that causes execution of ERSUME (with return-to-handler (RTH) functionality) instruction 718 to cause (i) invocation of (e.g., AEX) handler 720 and (ii) then resumption of execution at 722 of the enclave 702.

Figure 8:
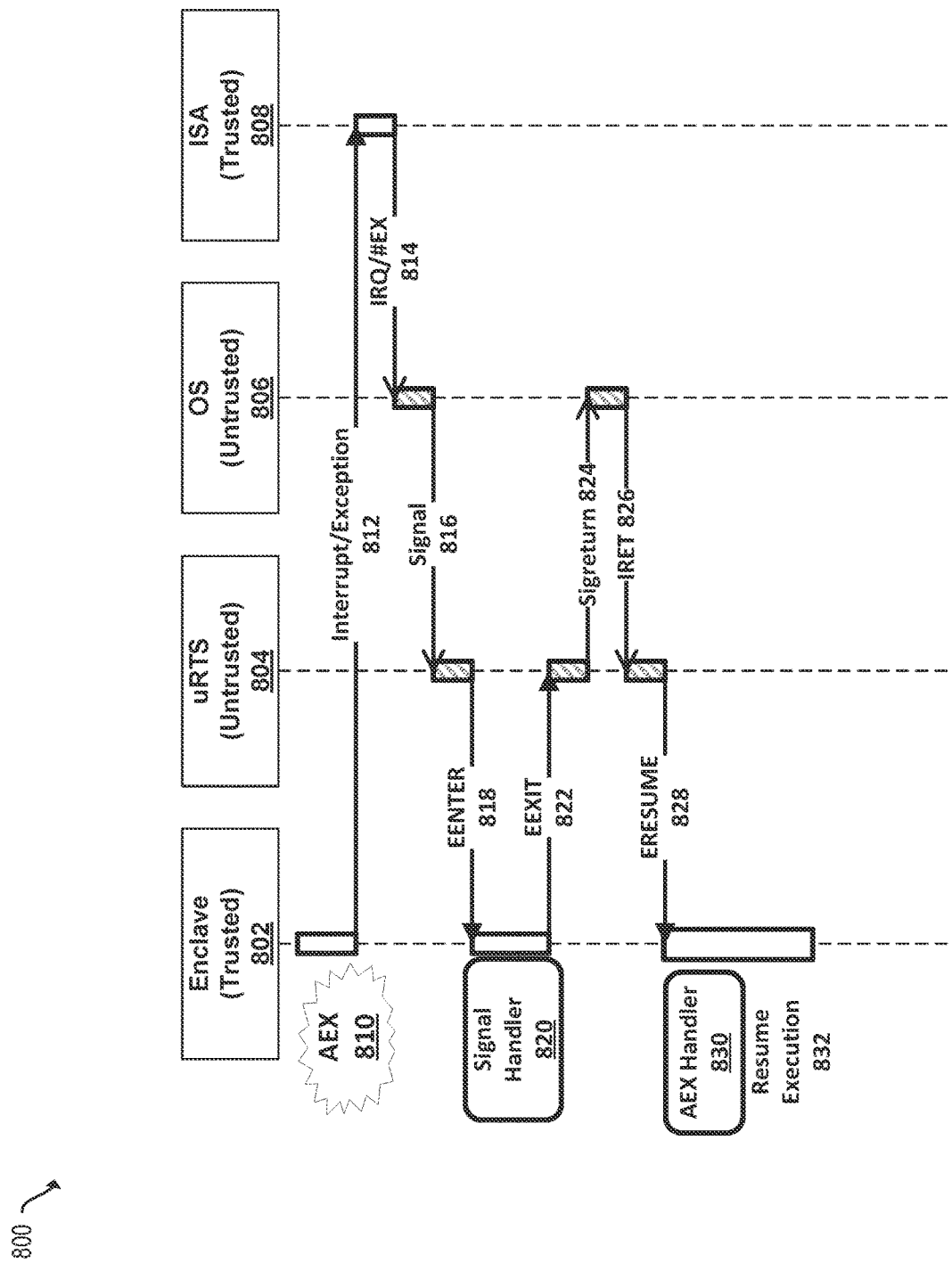
FIG. 8 illustrates a method of handling an asynchronous exit of the execution of code from an enclave that utilizes an enclave enter instruction, an enclave exit instruction, and an enclave resume instruction that invokes a handler to handle an operating system signal caused by the asynchronous exit and then resumes execution of the code from the enclave according to embodiments of the disclosure.

FIG. 8 illustrates a method of handling an asynchronous exit 810 (AEX) of the execution of code from an enclave 802 that utilizes an enclave enter instruction 818 (EENTER), an enclave exit instruction 822 (EEXIT), and an enclave resume instruction 828 (ERESUME) that invokes a handler to handle an operating system signal caused by the asynchronous exit and then resumes execution of the code from the enclave according to embodiments of the disclosure. In certain embodiments, enclave 802 is a trusted (e.g., for security purposes) execution environment (e.g., an architecturally protected enclave) for user code, untrusted (e.g., for security purposes) run-time system 804 (uRTS) is untrusted user code, operating system (OS) 806 is untrusted, and ISA 808 (e.g., processor) is trusted. FIG. 8 illustrates how an ERESUME instruction according to this disclosure can be used where some signals cannot circumvent the nested EENTER and EEXIT. One such example is when a page is to be dynamically allocated to an enclave, e.g., that uses enclave dynamic memory management (EDMM). In one embodiment, because the uRTS 804 and OS 806 are to be informed that the enclave 802 was able to successfully accept (e.g., EACCEPT) a page, the enclave signal handler 820 is to be invoked before the signal can be fully unwound. Notice that the AEX handler 830 can still be used to deploy mitigations following the ERESUME 828 in certain embodiments.

In certain embodiments, when an event (e.g., interrupt or exception 812) triggers an AEX 810, enclave execution is suspended, and control is transferred to the OS, e.g., via transmission of interrupt/exception 812 to ISA 808, which then transmits interrupt/exception 812 to the untrusted OS 806, e.g., via interrupt request 814 (IRQ) (e.g., identifying the particular interrupt/exception). The OS 806 may then choose to deliver an appropriate signal 816 to the uRTS 804, which in turn may choose to deliver the signal to the enclave by making a nested ECALL (i.e., EENTER 818 and EEXIT 822) into the (e.g., registered) signal (e.g., exception) handler 820. For example, with EEXIT 822 to uRTS 804 causing signal return 824 to OS 806, and the OS causing an interrupt return 826 (IRET), that causes execution of ERSUME (with return-to-handler (RTH) functionality) instruction 828 to cause (i) invocation of (e.g., AEX) handler 830 and (ii) then resumption of execution at 832 of the enclave 802.

In one embodiment for enclave page faults (#PF), the process is as follows: the #PF occurs—this could be due to an errant pointer, paged out page, or normal fault expected for EDMM type operation (e.g., the enclave needs to do an EACCEPT). It can also be triggered by a malicious adversary manipulating the enclave's page tables. The OS gets the #PF. There are two cases to consider: (1) If the OS handles the fault, it continues processing and ERESUME eventually returns control to the signal/AEX handler. At this point, the enclave may choose to deploy side channel mitigations before resuming security-critical execution. (2) If the OS does not handle the fault, then it issues a signal to the thread/process—the signal handler sees the signal (e.g., a segmentation fault that indicate an invalid memory reference (e.g., "SIGSEGV")), puts information on the fault into an exception info a buffer, and completes the signal. The OS returns control to the uRTS which issues an ERESUME. If the OS did not handle the fault in step 2, then the enclave signal may observe the #PF information following ERESUME—if it can trust the information, then it does its best to handle the fault in certain embodiments. The handler has three options at this point: (i) It has enough trusted information to handle the fault and continue. It may also opt to deploy side channel mitigations at this point. (ii) It can determine that the fault cannot be handled—it is to find a way to return from the enclave via the original root ECALL or raise some exception which will cause the untrusted run-time to terminate the enclave and unwind the call-stack. (iii) It can do neither because it cannot trust the #PF information or because the #PF information does not have all the bits of the #PF address (e.g., CR3 shaves the bottom (e.g., 12) bits from the #PF address when the #PF occurs in an enclave). In this case, the AEX Handler can tell the uRTS not to do the automatic fault completion/ERESUME, but do an EENTER, and then reissue the faulting instruction—the #PF will occur again and the uRTS will get the signal and issue EENTER. This may be the flow depicted in FIG. 8.

Turning again to FIGS. 1-2, embodiments of an ERSUME (with return-to-handler (RTH) functionality) instruction may be implemented by adding and/or modifying certain fields. While example below may be utilized with a certain ISA (e.g., SGX extension), it should be understood that embodiments herein can be applied similarly to other ISAs, e.g., implementing a TEE.

Certain embodiments herein may be used to modify an existing instruction, for example, without adding a new instruction (e.g., opcode) and/or without adding architectural register(s), e.g., architectural register(s) used to deliver an AEX notification. Certain embodiments herein add return-to-handler (RTH) functionality to a TEE entry (e.g., resume) instruction.

In certain embodiments, the thread control structure (TCS) (e.g., TCS 126 in FIG. 2) and state-save area (SSA) fields (e.g., in FIG. 3) are to include one or more of:

TCS.FLAGS.RTH: Bit that enables the RTH feature for the enclave (e.g., once set, cannot be unset for that enclave). This may be a field added to FLAGS field 202 of thread control structure 126, e.g., that when set to 1 indicates the RTH feature is enabled for an ERESUME to that enclave and when set to 0 indicates the RTH feature is disabled for an ERESUME to that enclave.

TCS.RTH_REDZONESIZE: Must match the red zone convention assumed by a compiler that was used to compile the enclave (e.g., this is a convention that may be determined by the system application binary interface (ABI)). This may be field 206 added to thread control structure 126.

TCS.HANDLER: Address of the (e.g., signal/AEX) handler that will be invoked on each ERESUME for this enclave thread when RTH is enabled. This may be field 208 added to thread control structure 126.

SSA[CSSA].RTH: Bit that enables the RTH feature for the current state-save area (CSSA). This bit can be toggled dynamically by enclave software. This may be a field added to CSSA field 204 of thread control structure 126, e.g., that when set to 1 indicates the RTH feature is enabled for a current SSA when set to 0 indicates the RTH feature is disabled for the current CSSA.

In certain embodiments, an enclave resume (ERESUME) instruction has one or more fields according to the following format:

| Opcode/<br>Instruction | Operand<br>Encoding<br>(Op/En) | 64/32<br>bit Mode<br>Support | CPUID<br>Feature<br>Flag | Description |
|---|---|---|---|---|
| EAX=03H<br>ENCLU[ERESUME] | IR (see<br>below) | Yes (V)/<br>Yes (V) | SGX1 | Reenter an<br>enclave, e.g.<br>after an interrupt<br>or exception |

In certain embodiments, an enclave resume (ERESUME) has one or more fields according to the following operand encoding "IR":

| Op/En | Tuple | Operand 1 | Operand 2 | Operand 3 | Operand 4 |
|---|---|---|---|---|---|
| IR | Not<br>Applicable | RAX<br>ERESUME(In) | RBX<br>Address<br>of a<br>TCS (In) | RCX<br>Address of<br>Asynchro-<br>nous<br>Exit<br>Pointer<br>(AEP) | Not<br>Applicable |

In certain embodiments, an enclave has read/write access to a TCS.

In certain embodiments, an enclave resume (ERESUME) instruction faults if any of:
Address in RBX is not properly aligned.
Any TCS.FLAGS's must-be-zero bit is not zero.
TCS pointed to by RBX is not valid or available or locked.
Current 32/64 mode does not match the enclave mode in SECS.ATTRIBUTES.MODE64.
The SECS is in use by another enclave. Either of TCS-specified FS and GS segment is not a subset of the current DS segment.
Any one of DS, ES, CS, SS is not zero. If XSAVE available, CR4.OSXSAVE=0, but SECS.ATTRIB-UTES.XFRM≠3.
CR4.OSFXSR≠1. If CR4.OSXSAVE=1, SECS.ATTRIB-UTES.XFRM is not a subset of XCR0.
Offsets 520-535 of the XSAVE area not 0. The bit vector stored at offset 512 of the XSAVE area must be a subset of SECS.ATTRIBUTES.XFRM.
The SSA frame is not valid or in use.
In certain embodiments, execution of an enclave resume (ERESUME) instruction performs the following operations:

RSP and RBP are saved in the current SSA frame on EENTER and are automatically restored on an asynchronous exit due to any Interrupt event.

The AEP contained in RCX is stored into the TCS for use by AEXs.FS and GS (including hidden portions) are saved and new values are constructed using TCS.OFS-BASE/GSBASE (32 and 64-bit mode) and TCS.OFSLIMIT/GSLIMIT (32-bit mode only). E.g., the resulting segments must be a subset of the DS segment.

If CR4.OSXSAVE==1, XCR0 is saved and replaced by SECS.ATTRIBUTES.XFRM. The effect of RFLAG-S.TF depends on whether the enclave entry is opt-in or opt-out (see Section 43.1.2):

On opt-out entry, TF is saved and cleared (it is restored on EEXIT or AEX). Any attempt to set TF via a POPF instruction while inside the enclave clears TF.

On opt-in entry, a single-step debug exception is pended on the instruction boundary immediately after EENTER.

All code breakpoints that do not overlap with ELRANGE are also suppressed. If the entry is an opt-out entry, all code and data breakpoints that overlap with the ELRANGE are suppressed In certain embodiments, execution of an enclave resume (ERESUME) instruction performs the following operations (e.g., pseudocode) with the added return-to-handler (RTH) fields shown in bold text:

```
IF (TCS.FLAGS.RTH = 1 & SSA[CSSA].RTH = 1)
   Then
      TMP_RSP ← RSP + TCS.RTH_REDZONESIZE;
      IF (EPCM(DS:TMP_RSP).VALID = 0) //Other EPCM checks may be required)
         Then #PF(DS:TMP_RSP); FI;
      RSP ← TMP_RSP;
      PUSH RIP; //And push RIP to shadow stack if CET is enabled)
      RIP ← TCS.HANDLER; //loads the handler
      SSA[CSSA].RTH ← 0; //clears RTH bit, if already cleared, jump to RIP
FI;
```

In certain embodiments, a handler (e.g., function) is to execute a return (RET) instruction to pop the RIP to resume code execution within the enclave (e.g., where RIP was where the signal that causes the AEX occurred in the enclave code. A processor may include an enclave page cache map (EPCM) is a secure structure used by the processor to track the contents of the EPC. In certain embodiments, if a PUSH RIP operation would cross over a page boundary, then both pages would require an enclave page cache map (EPCM) checks prior to the push.

In certain embodiments, execution of an enclave resume (ERESUME) instruction checks whether the RTH feature is enabled for this enclave thread and for the CSSA. If so, then ensure that the call stack for the signal/AEX handler is valid (e.g., EPCM) memory and push RIP (e.g., the address where the AEX occurred) to the stack—the corresponding RET at the end of the signal/AEX handler will resume execution at this location. After pushing RIP, set RIP to point to the signal/AEX handler, and finally disable RTH for the signal/AEX handler. The signal/AEX handler can re-enable RTH at any point, or choose to leave it off. In certain embodiments, always unsetting SSA[CSSA].RTH during the flow prevents cascading interrupts/exceptions from overflowing the call stack.

Figure 9:
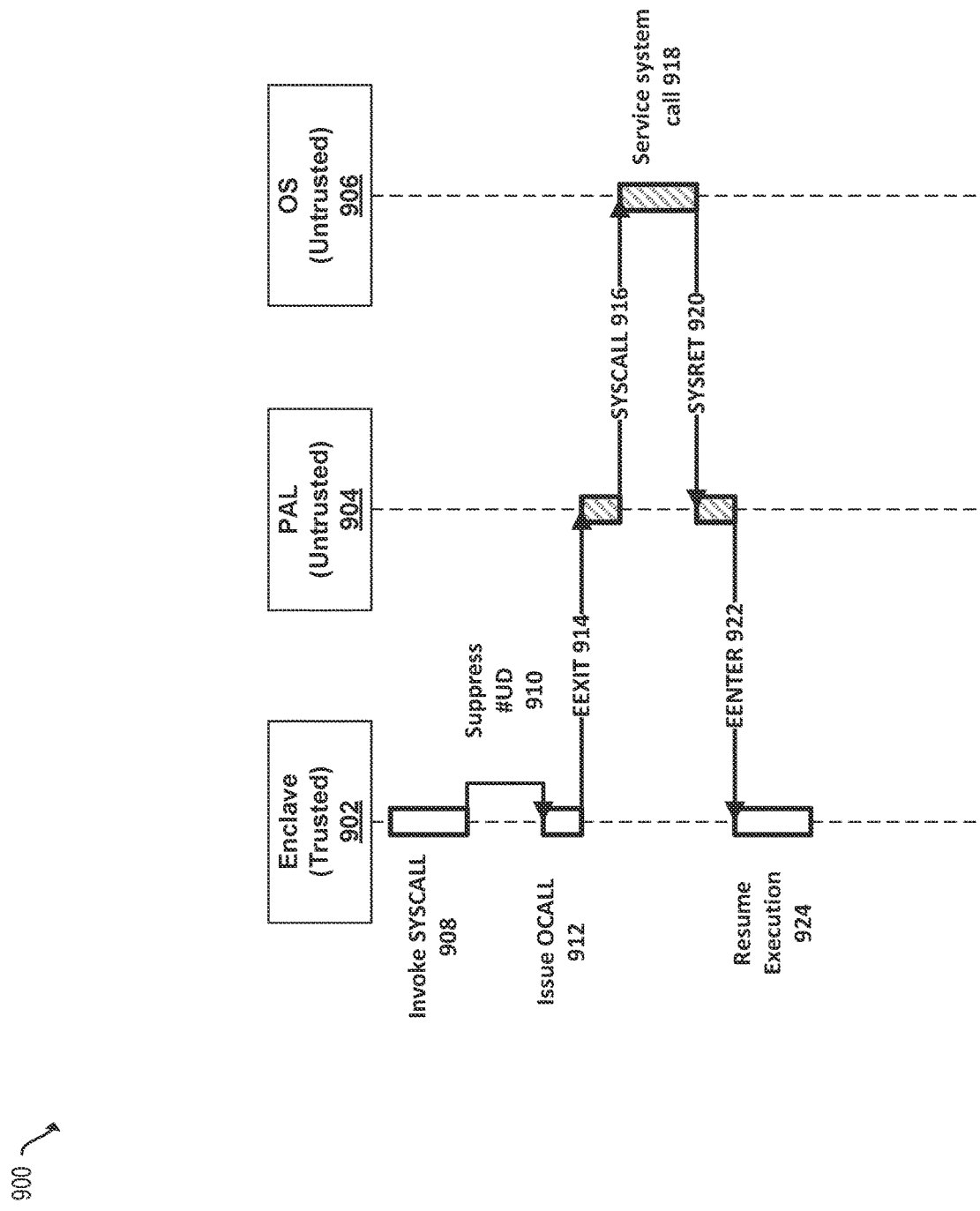
FIG. 9 illustrates a method of handling an exception with an enclave that comprises a field to indicate a set of one or more exceptions to suppress, and when execution of the code in the enclave encounters the exception, a handler is invoked without delivering the exception to an operating system according to embodiments of the disclosure.

FIG. 9 illustrates a method of handling an exception with an enclave 902 that comprises a field to indicate a set of one or more exceptions to suppress, and when execution of the code in the enclave encounters the exception, a handler is invoked without delivering the exception to an operating system 906 according to embodiments of the disclosure. In certain embodiments, enclave 902 is a trusted (e.g., for security purposes) execution environment (e.g., an architecturally protected enclave) for user code, untrusted (e.g., for security purposes) platform abstraction layer 904 (uRTS) is untrusted, and operating system (OS) 906.

In certain embodiments where the uRTS or OS are not needed to handle the exception at all, the context switch can be elided entirely by making a minor modification to AEX and to the enclave ISA. For example, the TCS and/or SSA can be augmented with an additional field that stores a bit vector specifying a set of exceptions to suppress. When the enclave thread executing with the RTH feature encounters an exception that was selected in the bit vector, the exception is not delivered to the kernel in certain embodiments. Instead, the signal handler is invoked directly, thus giving the enclave thread the opportunity to handle the exception immediately. These embodiments thus would benefit frameworks that enable legacy code execution within enclaves. FIG. 9 demonstrates how the flow in FIG. 5 could be adapted to handle illegal instructions efficiently—without requiring legacy code to be refactored to omit/replace those instructions. In certain embodiments, the example framework would (e.g., always) enable RTH before transferring control to the legacy application. For example, if the legacy application executing with enclave 902 invokes an instruction that is disallowed within an enclave (e.g., SYSCALL 908), the exception (e.g., #UD) is suppressed at 910 and control is transferred to the enclave's signal handler. The signal handler will then attempt to determine the cause of the exception. In this example, it can examine the saved RIP, and determine that a SYSCALL had been issued. The handler will then make an OCALL 912 (e.g., EEXIT 914 followed by EENTER 922) to the untrusted PAL 904 to handle the SYSCALL appropriately. After the SYSCALL has been serviced, the signal handler may re-enable RTH, and return control to the legacy application at the instruction following the SYSCALL. For example, with OCALL 912 causing EEXIT 914, which causes system call (SYSCALL) 916 to OS 906 that services the system call at 918, then executes a system return (SYSRET) 920, which causes execution of EENTER 922 to enter enclave 902 and resume execution at 924.

Embodiments herein improve the performance of enclave code (e.g., programs) by reducing the number of enclave to non-enclave context switches required to handle asynchronous events, e.g., instead of handling an asynchronous event within an enclave with four context switches. Embodiments herein allow an asynchronous event that can be handled within the enclave to be addressed with only two (or none) context switches. Embodiments herein allow an asynchronous event that previously required assistance from an uRTS or OS (e.g., via an OCALL, and thus four context switches) to allow certain exception(s) to be handled within the enclave (e.g., without any context switches), see, e.g., the discussion of FIG. 8. Embodiments herein relaxes constraints on legacy code, e.g., reducing the refactoring effort when porting legacy code into an enclave. Embodiments herein allow enclave software to mitigate a wide variety of vulnerabilities, e.g., those that rely on a "single-stepping" technique.

Figure 10:
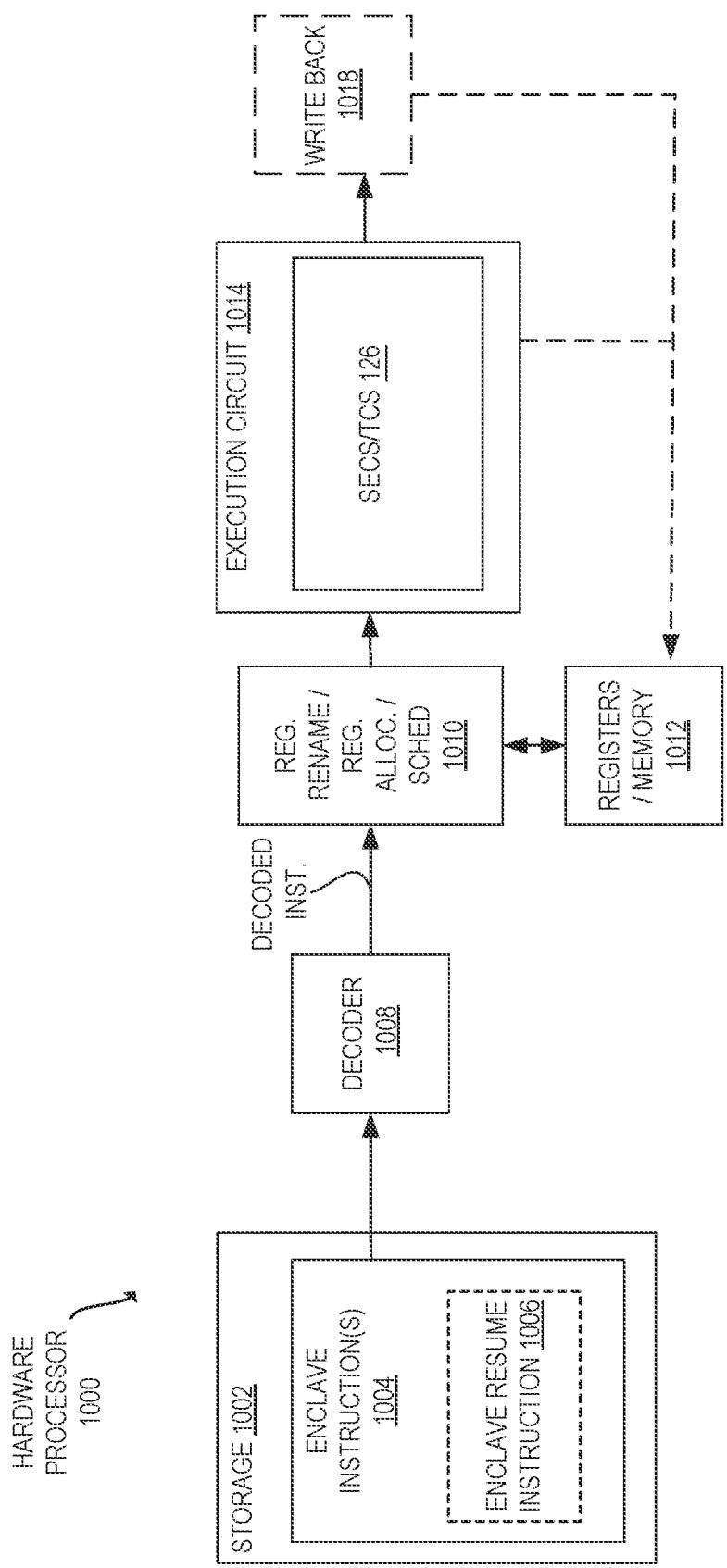
FIG. 10 illustrates a hardware processor coupled to storage that includes one or more enclave instructions (e.g., an enclave resume (ERESUME) instruction) according to embodiments of the disclosure.

FIG. 10 illustrates a hardware processor 1000 coupled to storage that includes one or more enclave instructions 1004 (e.g., an enclave resume (ERESUME) instruction 1006) according to embodiments of the disclosure. In certain embodiments, enclave resume (ERESUME) instruction 1006 is according to any of the disclosure herein. In certain embodiments, one or more enclave instructions 1004 includes other enclave instructions, e.g., the user-level and supervisor-level enclave instructions discussed herein.

In one embodiment, e.g., in response to a request to perform an operation, the instruction (e.g., macro-instruction) is fetched from storage 1002 and sent to decoder 1008. In the depicted embodiment, the decoder 1008 (e.g., decoder circuit) decodes the instruction into a decoded instruction (e.g., one or more micro-instructions or micro-operations). The decoded instruction is then sent for execution, e.g., via scheduler circuit 1010 to schedule the decoded instruction for execution.

In certain embodiments, (e.g., where the processor/core supports out-of-order (OoO) execution), the processor includes a register rename/allocator circuit 1010 coupled to register file/memory circuit 1012 (e.g., unit) to allocate resources and perform register renaming on registers (e.g., registers associated with the initial sources and final destination of the instruction). In certain embodiments, (e.g., for out-of-order execution), the processor includes one or more scheduler circuits 1010 coupled to the decoder 1008. The scheduler circuit(s) may schedule one or more operations associated with decoded instructions, including one or more operations decoded from an enclave instructions 1004 (e.g., an enclave resume (ERESUME) instruction 1006), e.g., for execution on the execution circuit 1014. Execution circuit 1014 may access a secure enclave control structure (SECS) and/or thread control structure (TCS) 126, e.g., and other enclave data structures such as, but not limited to, an SSA.

In certain embodiments, a write back circuit 1018 is included to write back results of an instruction to a destination (e.g., write them to a register(s) and/or memory), for example, so those results are visible within a processor (e.g., visible outside of the execution circuit that produced those results).

One or more of these components (e.g., decoder 1008, register rename/register allocator/scheduler 1010, execution circuit 1014, registers (e.g., register file)/memory 1012, or write back circuit 1018) may be in a single core of a hardware processor (e.g., and multiple cores each with an instance of these components).

Figure 11:
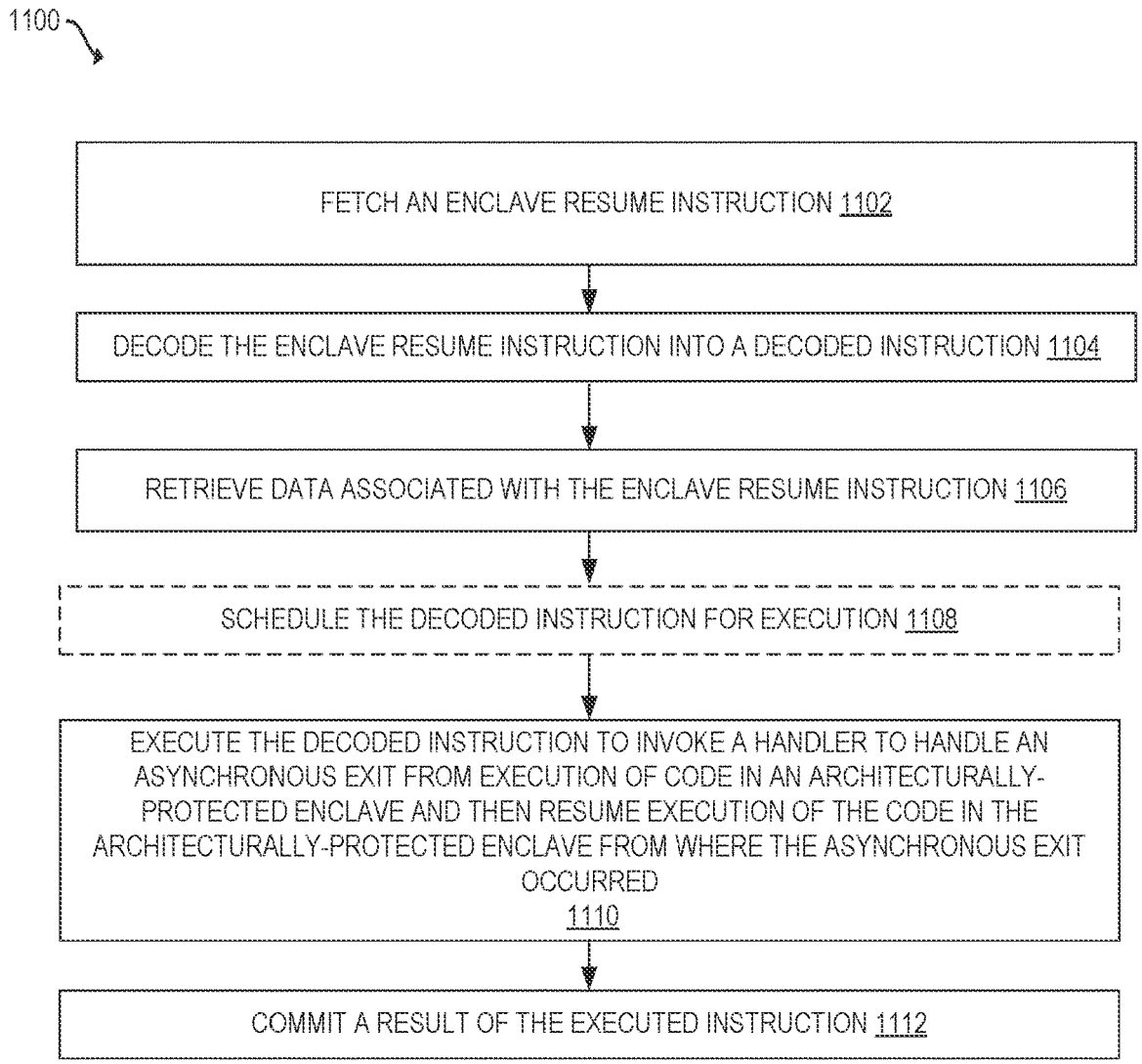
FIG. 11 is a flow diagram illustrating operations of a method for processing an "ERESUME" instruction according to embodiments of the disclosure.

FIG. 11 is a flow diagram illustrating operations 1100 of a method for processing an "ERESUME" instruction according to embodiments of the disclosure. A processor (e.g., or processor core) may perform operations 1100 of method, e.g., in response to receiving a request to execute an instruction from software. Depicted operations 1100 includes processing an "ERESUME" instruction by performing a: fetch of an instruction (e.g., having an opcode corresponding to the ERESUME mnemonic) 1102, decode of the instruction into a decoded instruction 1104, retrieve data associated with the instruction 1106, (optionally) schedule the decoded instruction for execution 1108, execute the decoded instruction to invoke a handler to handle an asynchronous exit from execution of code in an architecturally protected enclave and then resume execution of the code in the architecturally protected enclave from where the asynchronous exit occurred 1110, and commit a result of the executed instruction 1112.

FIG. 12 is a flow diagram illustrating operations 1200 of another method for processing an "ERESUME" instruction according to embodiments of the disclosure. Some or all of the operations 1200 (or other processes described herein, or variations, and/or combinations thereof) are performed under the control of a processor that implements an architecturally protected execution environment for code in an architecturally protected enclave.

The operations 1200 include, at block 1202, enabling an architecturally protected execution environment for code in an architecturally protected enclave in memory in response to a field of a register of a hardware processor being set. The operations 1200 further include, at block 1204, decoding a single instruction comprising an opcode into a decoded single instruction with a decoder circuit of the hardware processor, the opcode indicating an execution circuit is to invoke a handler to handle an asynchronous exit from execution of the code in the architecturally protected enclave and then resume execution of the code in the architecturally protected enclave from where the asynchronous exit occurred. The operations 1200 further include, at block 1206, executing the decoded single instruction according to the opcode by the execution circuit of the hardware processor.

Exemplary architectures, systems, etc. that the above may be used in are detailed below.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
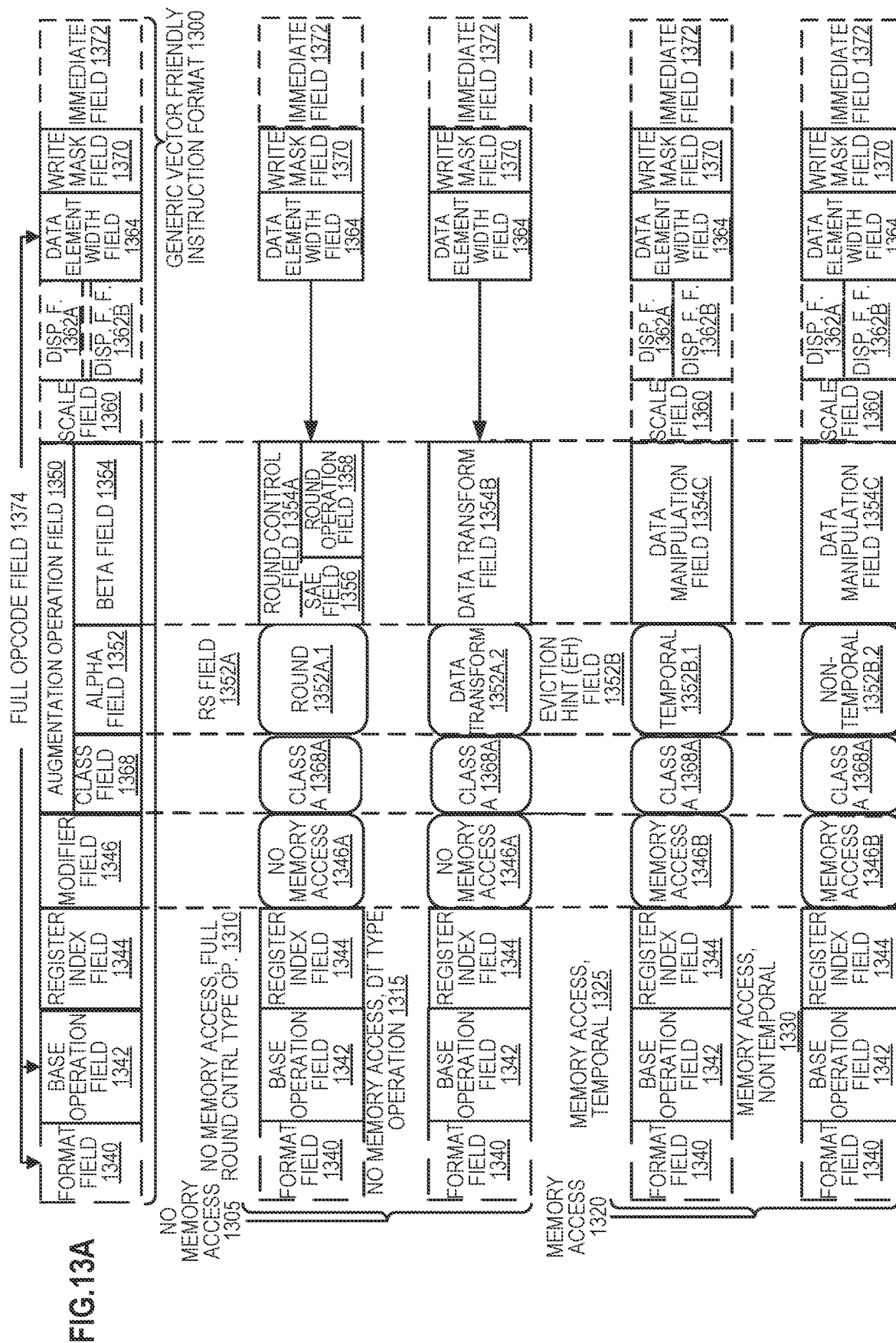
FIG. 13A is a block diagram illustrating a generic vector friendly instruction format and class A instruction templates thereof according to embodiments of the disclosure.
Figure 13B:
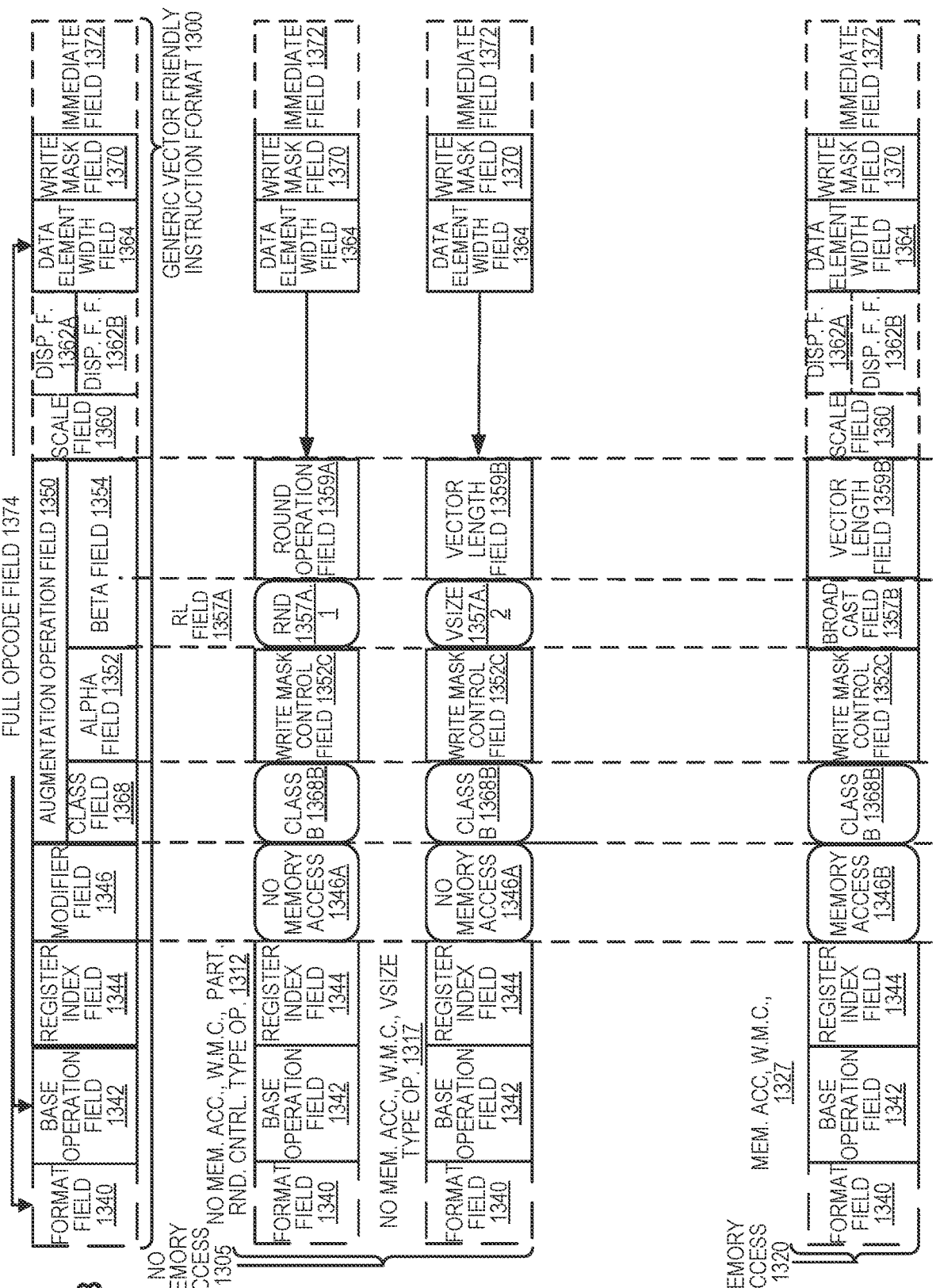
FIG. 13B is a block diagram illustrating the generic vector friendly instruction format and class B instruction templates thereof according to embodiments of the disclosure.

FIGS. 13A-13B are block diagrams illustrating a generic vector friendly instruction format and instruction templates thereof according to embodiments of the disclosure. FIG. 13A is a block diagram illustrating a generic vector friendly instruction format and class A instruction templates thereof according to embodiments of the disclosure; while FIG. 13B is a block diagram illustrating the generic vector friendly instruction format and class B instruction templates thereof according to embodiments of the disclosure. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the disclosure, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*index+base$).

Displacement Field 1362A—its content is used as part of memory address generation (e.g., for address generation that uses $2^{scale}*index+base+displacement$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled$ displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the disclosure are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the disclosure the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the disclosure where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the disclosure where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14 is a block diagram illustrating an exemplary specific vector friendly instruction format according to embodiments of the disclosure. FIG. 14 shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14 map are illustrated.

It should be understood that, although embodiments of the disclosure are described with reference to the specific vector friendly instruction format 1400 in the context of the generic vector friendly instruction format 1300 for illustrative purposes, the disclosure is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the disclosure is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]-R), EVEX.X bit field (EVEX byte 1, bit [6]-X), and 1357 BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-mmmm)—its content encodes an implied leading opcode byte (0F, 0F 38, or 0F 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.U=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field;

and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1372 operates as previously described.

Full Opcode Field

FIG. 14B is a block diagram illustrating the fields of the specific vector friendly instruction format 1400 that make up the full opcode field 1374 according to one embodiment of the disclosure. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the disclosure. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
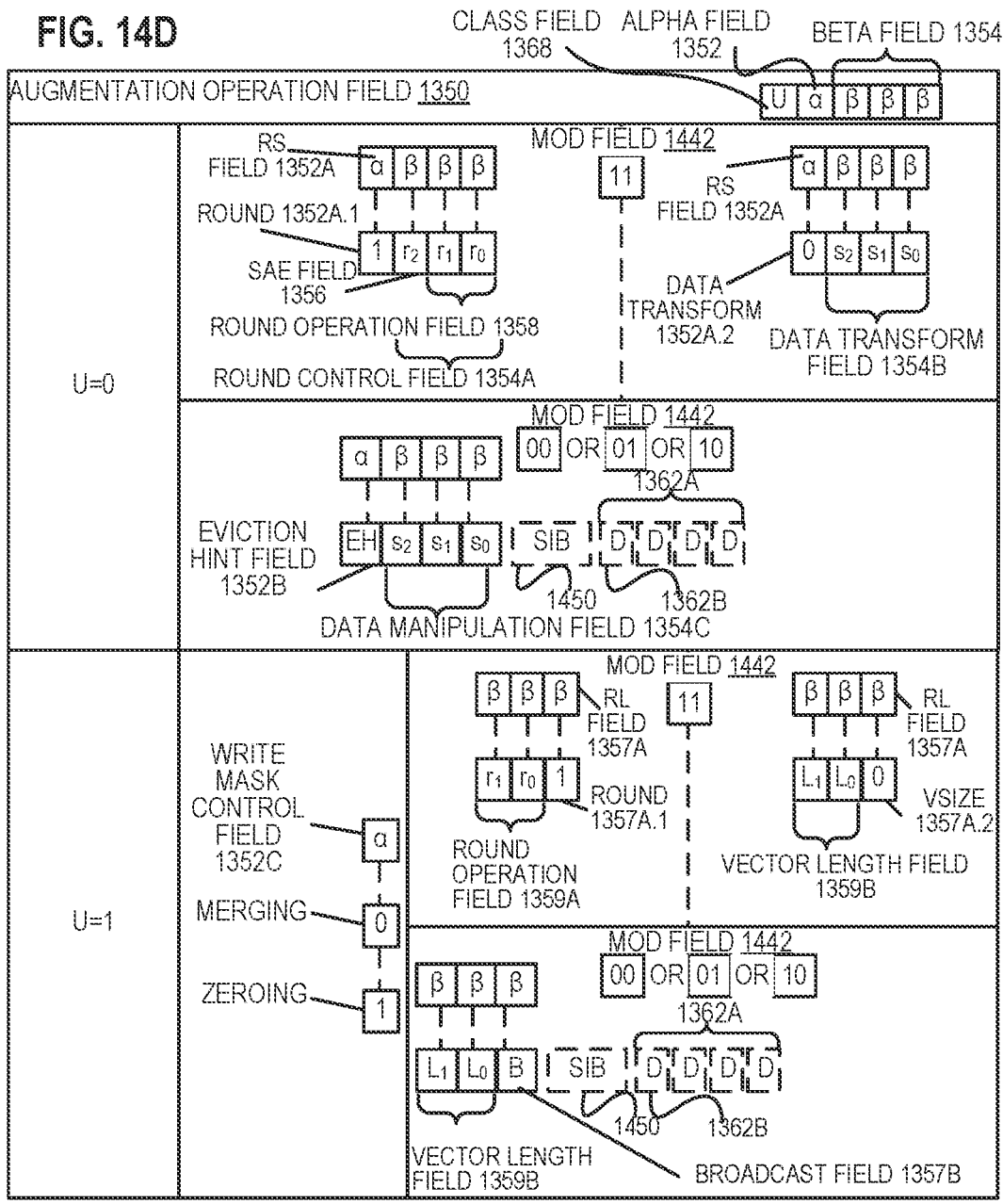
FIG. 14D is a block diagram illustrating the fields of the specific vector friendly instruction format in FIG. 14A that make up the augmentation operation field 1350 according to one embodiment of the disclosure.

FIG. 14D is a block diagram illustrating the fields of the specific vector friendly instruction format 1400 that make up the augmentation operation field 1350 according to one embodiment of the disclosure. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-$S_0$) is interpreted as the RL field 1357A; when it contains a 1 (round 1357A.1) the rest of the beta field 1354 (EVEX byte 3, bit [6-5]-$S_{2-1}$) is interpreted as the round operation field 1359A, while when the RL field 1357A contains a 0 (VSIZE 1357.A2) the rest of the beta field 1354 (EVEX byte 3, bit [6-5]-$S_{2-1}$) is interpreted as the vector length field 1359B (EVEX byte 3, bit [6-5]- $L_{1-0}$). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-$L_{1-0}$) and the broadcast field 1357B (EVEX byte 3, bit [4]-B).

Exemplary Register Architecture

Figure 15:
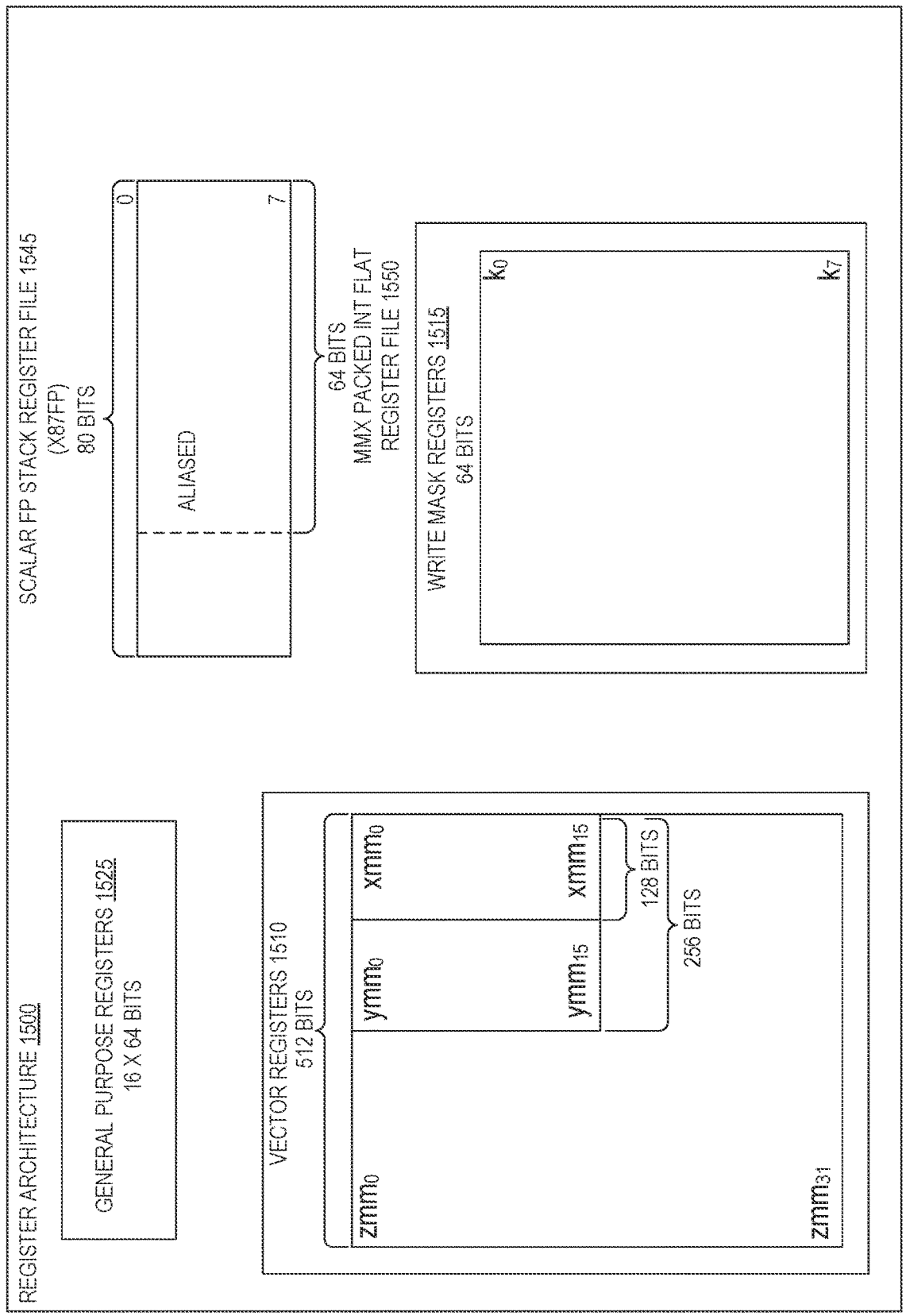
FIG. 15 is a block diagram of a register architecture according to one embodiment of the disclosure

FIG. 15 is a block diagram of a register architecture 1500 according to one embodiment of the disclosure. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U=0) | 1310, 1315, 1325, 1330 | zmm registers (the vector length is 64 byte) |
| | B (FIG. 13B; U=1) | 1312 | zmm registers (the vector length is 64 byte) |
| Instruction templates that do include the vector length field 1359B | B (FIG. 13B; U=1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the disclosure. FIG. 16B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macro-instructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17B:
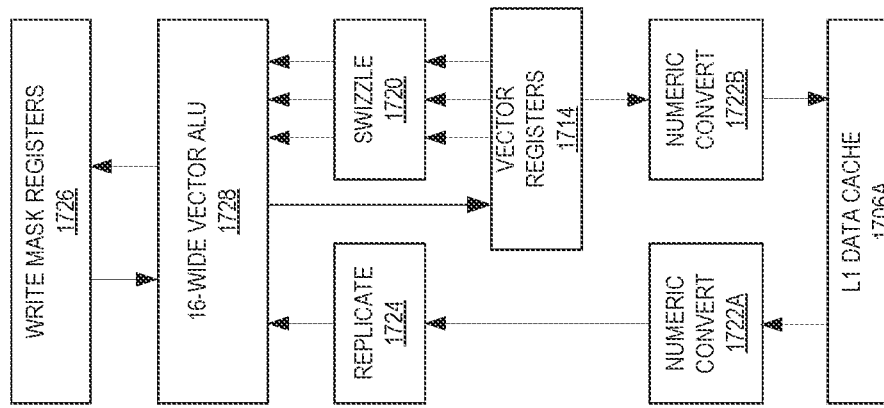
FIG. 17B is an expanded view of part of the processor core in FIG. 17A according to embodiments of the disclosure.
Figure 17A:
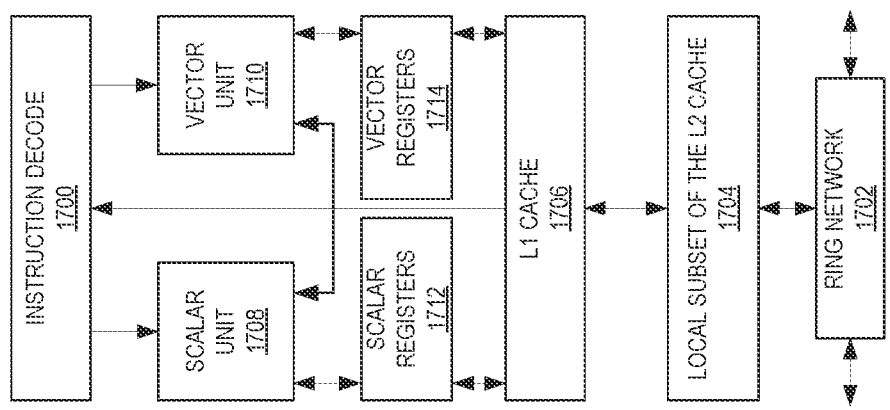
FIG. 17A is a block diagram of a single processor core, along with its connection to the on-die interconnect network and with its local subset of the Level 2 (L2) cache, according to embodiments of the disclosure.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the disclosure. In one embodiment, an instruction decode unit 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the disclosure may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the disclosure. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
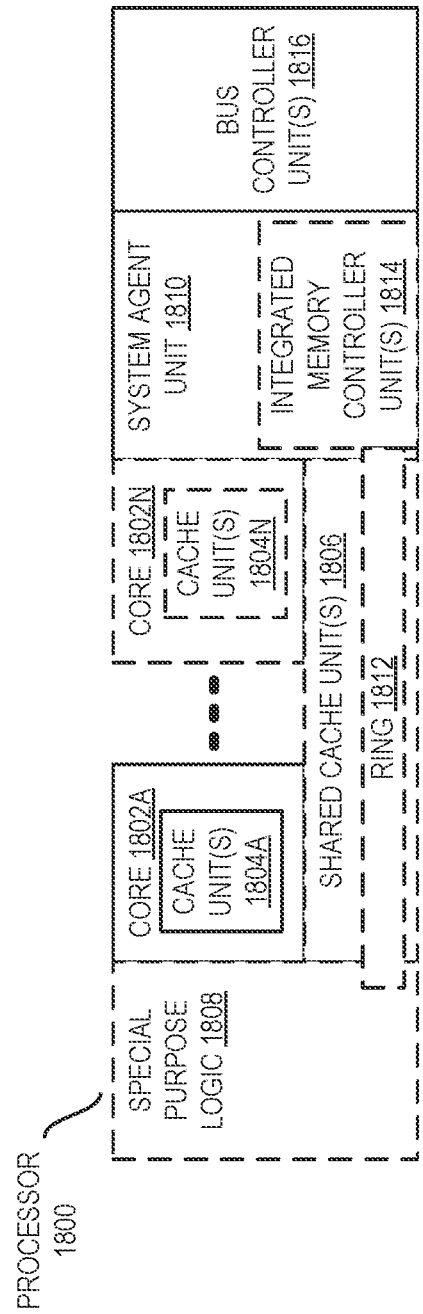
FIG. 18 is a block diagram of a processor that may have more than one core, may have an integrated memory controller, and may have integrated graphics according to embodiments of the disclosure.

FIG. 18 is a block diagram of a processor 1800 that may have more than one core, may have an integrated memory controller, and may have integrated graphics according to embodiments of the disclosure. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multithreading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
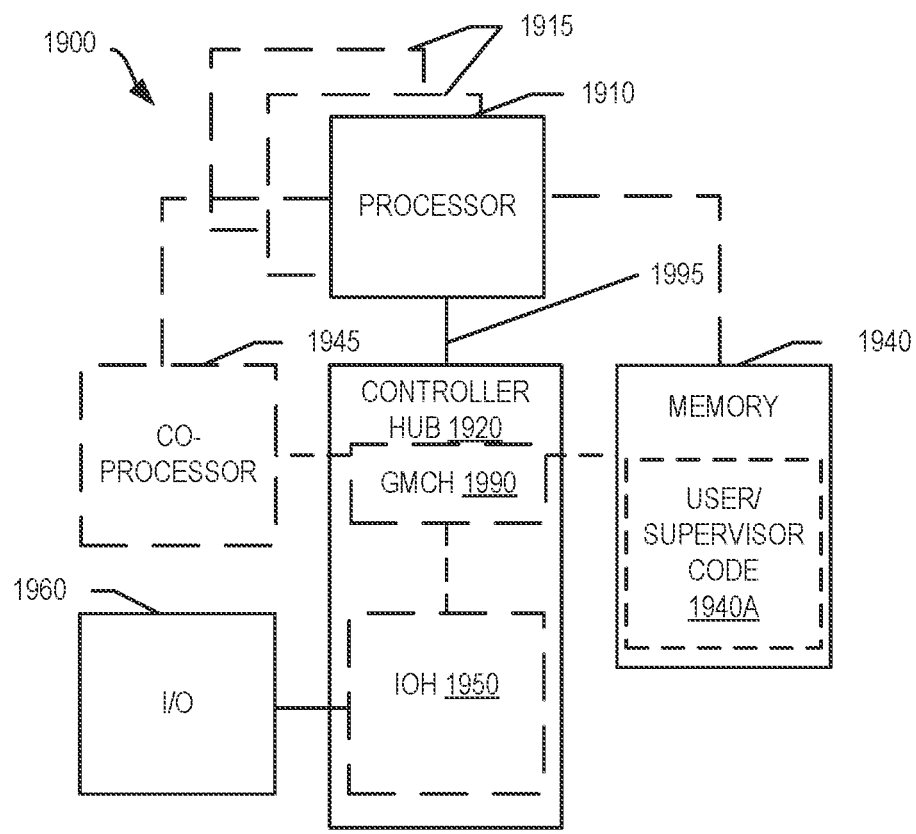
FIG. 19 is a block diagram of a system in accordance with one embodiment of the present disclosure.

Referring now to FIG. 19, shown is a block diagram of a system 1900 in accordance with one embodiment of the present disclosure. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950. Memory 1940 may include user and/or supervisor code 1940A, for example, to store code that when executed causes a processor to perform any method of this disclosure.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as Quickpath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
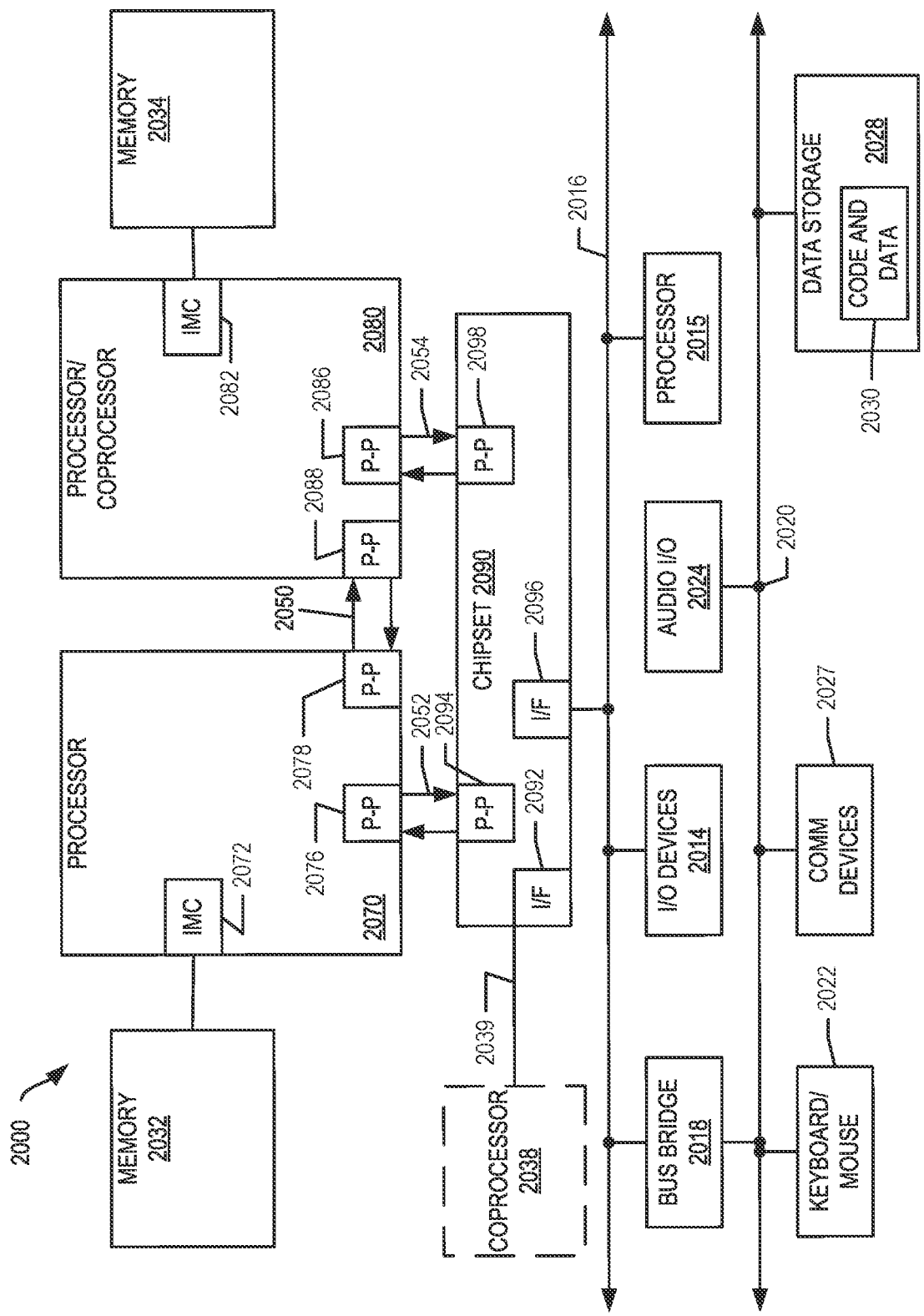
FIG. 20 is a block diagram of a more specific exemplary system in accordance with an embodiment of the present disclosure.

Referring now to FIG. 20, shown is a block diagram of a first more specific exemplary system 2000 in accordance with an embodiment of the present disclosure. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the disclosure, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present disclosure is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
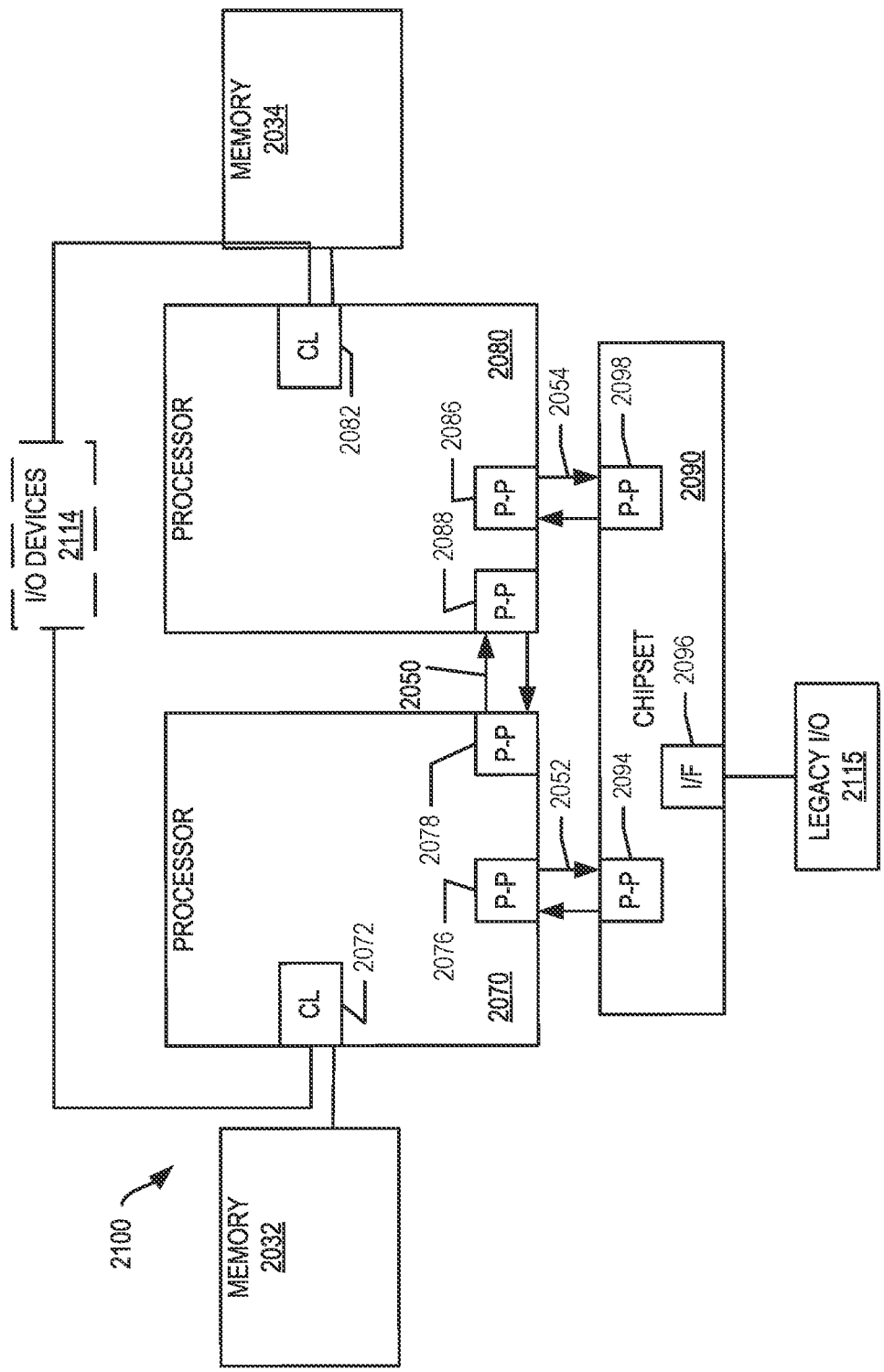
FIG. 21, shown is a block diagram of a second more specific exemplary system in accordance with an embodiment of the present disclosure.

Referring now to FIG. 21, shown is a block diagram of a second more specific exemplary system 2100 in accordance with an embodiment of the present disclosure. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
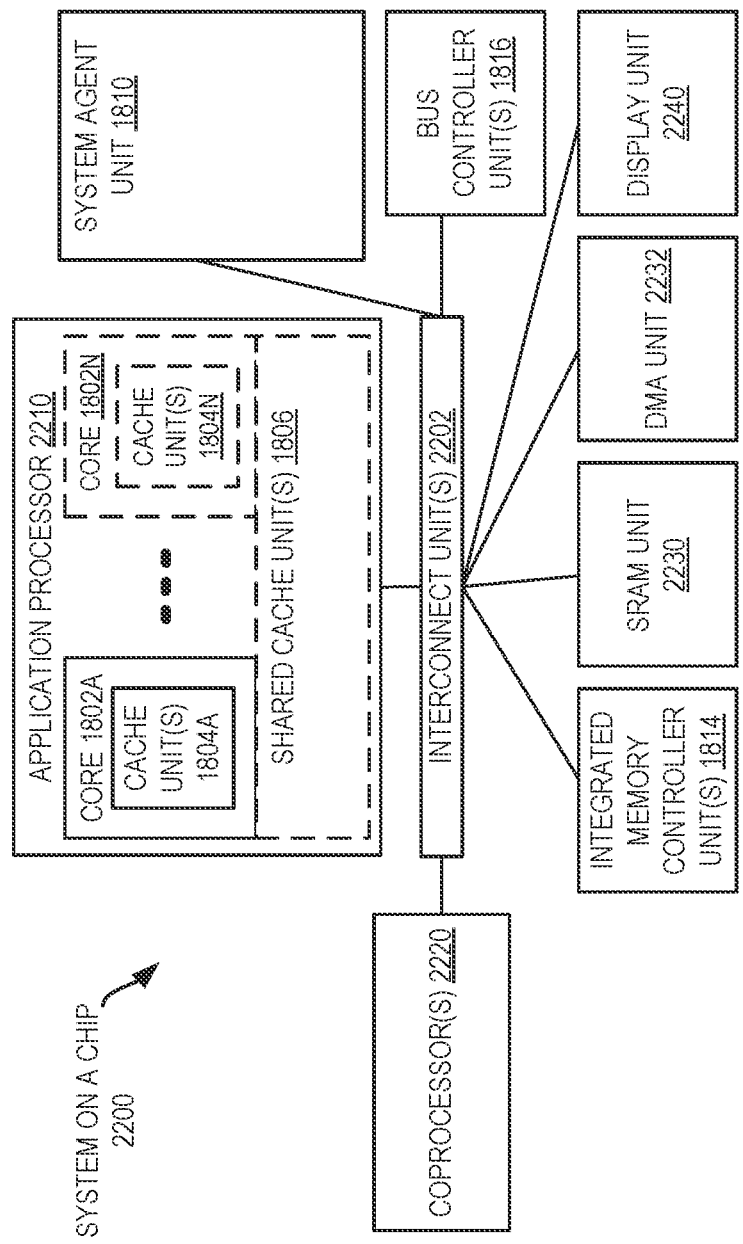
FIG. 22, shown is a block diagram of a system on a chip (SoC) in accordance with an embodiment of the present disclosure.

Referring now to FIG. 22, shown is a block diagram of a SoC 2200 in accordance with an embodiment of the present disclosure. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 1802A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
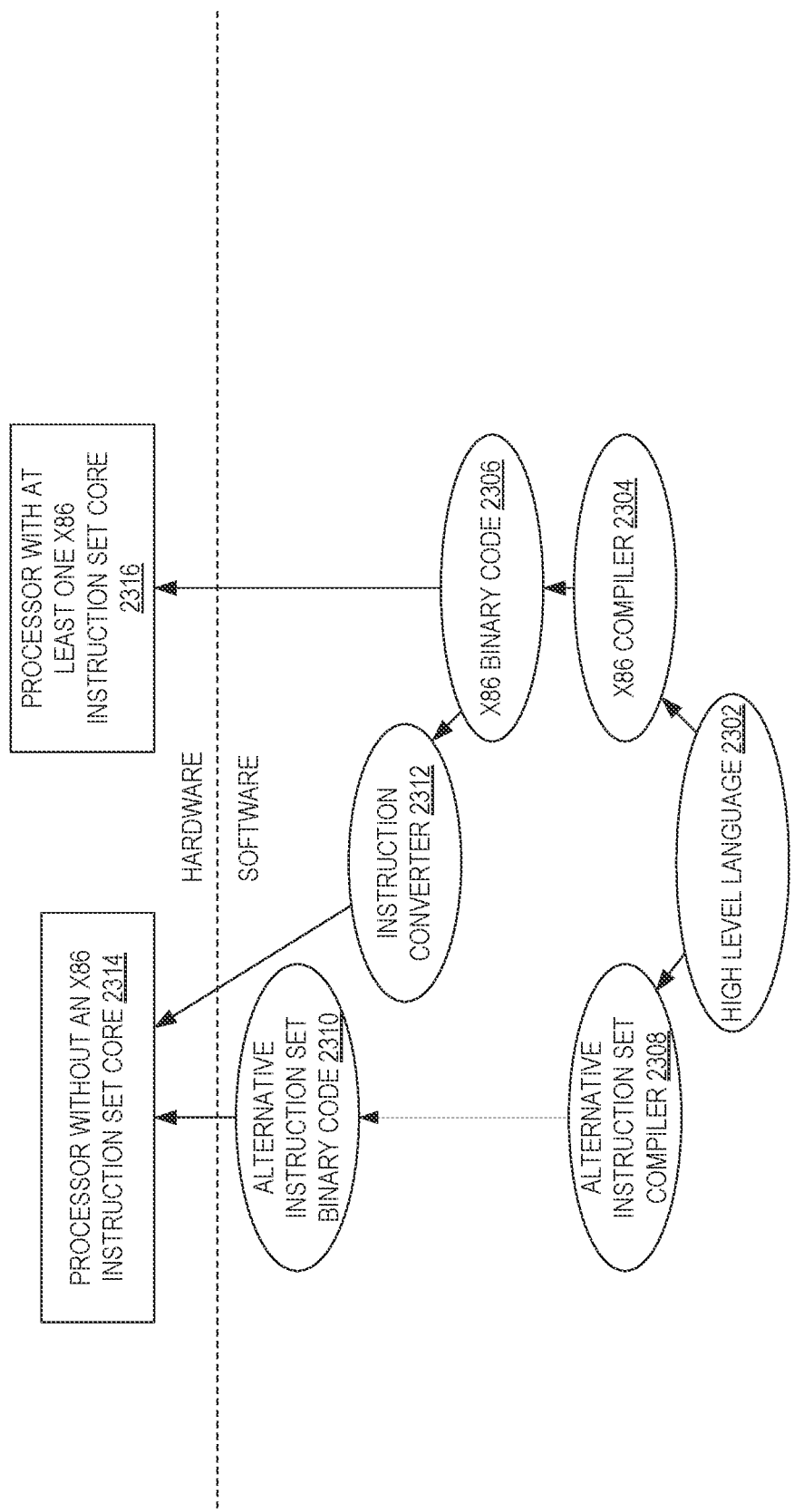
FIG. 23 is a block diagram contrasting the use of a software instruction converter to convert binary instructions in a source instruction set to binary instructions in a target instruction set according to embodiments of the disclosure.

FIG. 23 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

Malicious Single Stepping and One Stepping of TEEs

As described above, researchers have focused on methods that induce interrupts or exceptions to maliciously single-step (e.g., SGX-Step) or zero-step the TEE (e.g., Microscope replay attack, PLATYPUS power side-channel attack). During single-stepping or zero-stepping, a malicious hypervisor or operating system (OS) may be able to increase the granularity of side channel information which can be collected during the TEE processing. Analyzing side channel information is a method that can be used to infer information, such as instruction flows and data, about the TEE. Thus, there is value in techniques that can mitigate these attack techniques, specifically single-stepping and zero-stepping of TEEs.

To address these and other enhancements, described herein are tools and techniques that address the common root causes among all of these attack techniques: single-stepping and zero-stepping of TEEs. In some examples, solutions can be predicated on a mechanism to deliver software notifications whenever the TEE encounters an asynchronous exit. For example, AEX Notify is an extension to Intel SGX that raises an in-enclave software handler when there is an asynchronous enclave exit (AEX). When specific control bits are set, the leaf instruction ENCLU[ERESUME] will call the AEX handler instead of directly resuming the interrupted enclave application. Some embodiments described herein provide in-enclave software mitigation techniques that make use of the AEX Notify feature.

The various techniques and technologies described herein can be combined with the AEX Notify instruction set architecture (ISA) to detect and prevent single-stepping and zero-stepping of a TEE. Described herein are detection techniques including: (1) monitoring forward execution progress via instrumentation and notification, (2) detecting faults to enforce a contract between the enclave and OS/hypervisor, and (3) counting the number of AEX during TEE execution either with a new AEX Counter or with a specialized AEX Notify handler. Similarly, described herein are prevention techniques including: (1) a software-based technique called memory tickling to warm up TEE memory, and (2) a software-based technique that uses transient execution to preload instruction cache.

Detection Techniques

In some examples a detection technique which comprises monitoring forward execution progress via instrumentation and notification may be implemented. The presence of an asynchronous exiting event software handler can allow the TEE to monitor forward progress. A lack of sufficient forward progress could indicate that the TEE is being single-stepped.

Figure 24:
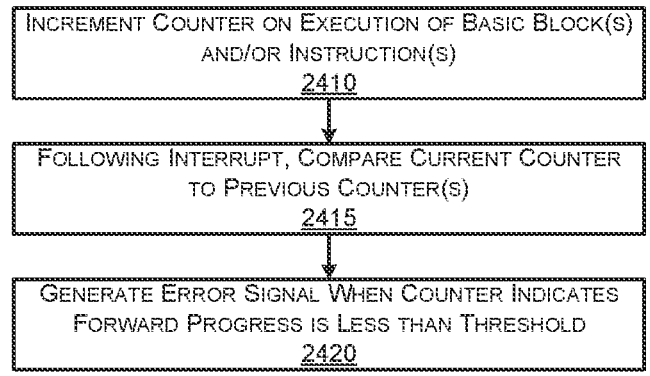
FIG. 24 is a flow diagram illustrating operations in a method for monitoring forward execution progress via instrumentation and notification in accordance with one embodiment of the present disclosure.

FIG. 24 is a flow diagram illustrating operations in a method for monitoring forward execution progress via instrumentation and notification in accordance with one embodiment of the present disclosure. Referring to FIG. 24, at operation 2410 the enclave compiler can instrument each basic block to increment a per-thread trusted counter. The counter can track the number of basic blocks executed by the enclave, the number of instructions executed, or another performance metric. At operation 2415, each time the enclave resumes into the handler, the current count can be compared to one or more previous values of the counter. In some examples, the enclave may define a threshold (n) corresponding to a minimum requirement for forward progress. If, at operation 2420, the median of the previous m counter deltas falls below n, then the enclave may be under attack and error may be generated notify a trusted remote party. For example, if n=5 and m=10, then the previous interrupts recorded forward progress measurements of 2, 0, 1, 900, 2, 10,000, 2, 0, 1, 1 blocks. The median forward progress is 2 blocks, which is less than the threshold of 5, so the enclave may conclude that it may be under attack and trigger an appropriate error message.

Figure 25:
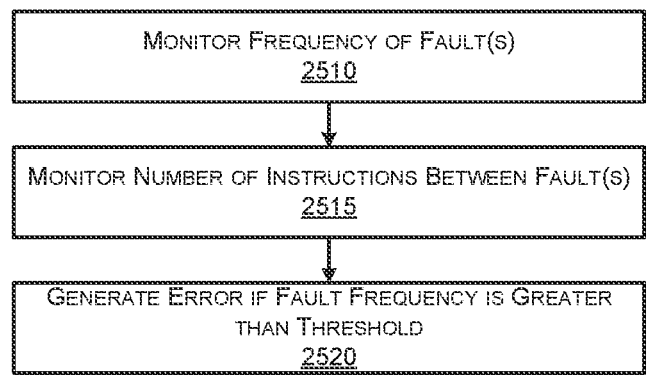
FIG. 25 is a flow diagram illustrating operations in a method for detecting faults to enforce a contract between the enclave and an operating system in accordance with one embodiment of the present disclosure.

In some examples a detection technique which comprises detecting faults to enforce a contract between the enclave and an operating system (e.g., hypervisor) may be implemented. FIG. 25 is a flow diagram illustrating operations in a method for detecting faults to enforce a contract between the enclave and an operating system in accordance with one embodiment of the present disclosure. Referring to FIG. 25, at operation 2510 the handler can monitor the frequency of faults, such as page faults, which can also be used by a malicious adversary to single-step an enclave. At operation 2515, the handler can monitor, for example, how many instructions have been executed between each detected page fault. At operation 2520 an error may be generated if the frequency of detected page faults exceeds a threshold. In addition, the TEE may implement procedure to abort execution, to attempt to notify the process owner, or may deploy another prevention countermeasure.

The TEE may also use a software mechanism (e.g., an API) to establish a static or dynamic contract on enclave page locking with the untrusted OS/VMM. An example might look like the UNIX mlock( ) API, by which the enclave could request that the OS/VMM not page out a contiguous region of enclave memory until a symmetric munlock( ) is invoked. If the OS/VMM accepts (e.g., mlock( ) returns true) then a detected page fault within a locked region can be interpreted by the TEE as a breach of the contract, and therefore that the host OS/VMM may be malicious. The TEE may then choose to abort, attempt to notify its owner, or deploy some other prevention countermeasures (such as those described elsewhere in this invention). If the OS/VMM does not accept (e.g., mlock( ) returns false), then the TEE may assume that it cannot safely use this memory safely. If the TEE is sufficiently small, then it may be possible to "lock" and protect the entire TEE in this manner.

In some examples a detection technique which comprises counting the number of AEX during TEE execution may be implemented. FIG. 26 is a flow diagram illustrating operations in a method for counting the number of AEX during TEE execution in accordance with one embodiment of the present disclosure. Referring to FIG. 26, at operation 2610 a hardware counter, referred to herein as an AEX counter, increments on the occurrence of each AEX. At operation 2615 an error is generated if the number of AEX occurrences exceeds a threshold.

The design of an AEX counter may comprise three components: the counter itself, a counting mechanism, and the interaction with software. For instance, an embodiment of the AEX counter can be implemented in SGX as a field in the SSA, TCS, or a new hardware register. An AEX counter may be implemented as a monotonic counter. An embodiment of the counter could increment at either TEE exit or TEE re-entry.

In some examples the AEX counter provides a trusted mechanism to detect unexpected AEXs during enclave execution. The security property of AEX counter is guaranteed by hardware. By contrast, software-only solutions cannot guarantee the correct delivery of the number of AEXs. A basic usage model is to detect AEX when executing a piece of security-sensitive code that do not tolerate attacks enabled by malicious interrupts.

FIG. 27 is a segment of pseudo-code 2700 illustrating operations in a method for counting the number of AEX during TEE execution in accordance with one embodiment of the present disclosure. Referring to FIG. 27, the function sensitive_crypto( ) performs a key generation operation and is executed in a TEE (e.g., an SGX enclave). The key generation process may leak the secret key if it is frequently interrupted to allow the outside party to perform attacks such as single-step attacks. Therefore, a do . . . while( ) loop is used to wrap the key generation operations with attack detection based on the proposed AEX counter. The AEX counter is cleared before generating a key and checked after it completes. If the counter value is incremented over a user-specified threshold, it suggests that too many interrupts occurred during the process and an attacker may be attempting to single step or zero step the enclave. Therefore, there is a need to restart the key generation until it is completed without attack potential. In some examples the AEX counter only serves as the detection, but it does not limit the attack prevention method. In FIG. 27, the attack prevention is to simply restart the sensitive operation, but other attack prevention schemes can also be applied.

Prevention Techniques

The software mitigation techniques in this invention comprise two techniques that can be implemented by an asynchronous exiting event software handler, referred to herein as a handler, such as AEX Notify handler. The two techniques address the detection and prevention of single-stepping attacks against TEEs such as Intel SGX.

A first mitigation technique described here may be referred to as memory tickling. In some examples the SGX-Step operates by manipulating SGX-Step also benefits from long TEE instruction latencies—this makes it easier for the tool to precisely land an interrupt at an adversary-chosen TEE instruction. The latency of TEE instructions can be decreased by warming up instructions and data, for example, by preloading them. A TEE can use a handler to prefetch/warm a portion of TEE memory that is likely to be used following the handler, thus reducing the effectiveness of a single-stepping tool like SGX-Step.

Figures 28, 29:
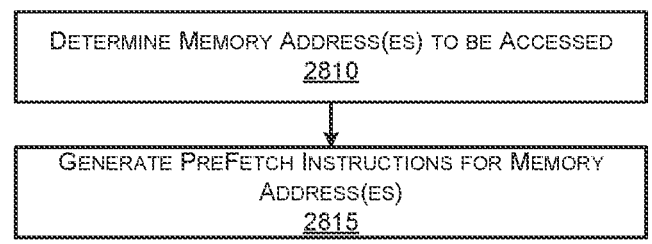
FIG. 28 is a flow diagram illustrating operations in a mitigation method in accordance with one embodiment of the present disclosure.
FIG. 29 is a segment of pseudo-code illustrating operations in a method for counting the number of AEX during TEE execution in accordance with one embodiment of the present disclosure.

To determine the range of the TEE memory to tickle, multiple options could be applied. For instance, one approach may be referred to as decode-and-tickle. It begins with tickling the first few instructions that are executed following the handler. FIG. 28 is a flow diagram illustrating operations in a mitigation method in accordance with one embodiment of the present disclosure. In some examples software instruction decoder in the TEE may determine, at operation 2810, which memory addresses will be accessed by the first few TEE instructions, and at operation 2815, tickling will be done on those memory addresses. This will warm up the CPU's cache and translation lookaside buffers (TLBs), and also set any A/D-bits that may have been unset by a malicious OS/VMM. Hence these first few TEE instructions should exhibit a much lower latency when they are actually executed after the handler returns to the main TEE flow. In another example, a dynamic workset may be maintained by the handler. The workset may include a certain number of TEE code pages, stack pages and heap pages. For example, in one construction the workset may record the most recently used memory pages. Every time the handler is raised due to a TEE exit, all the cachelines of the pages in the workset will be tickled.

A second mitigation technique may utilize transient execution to preload caches and or translation lookaside buffers (TLBs). In some examples the CPU may execute the first few instructions in a workset by inducing branch speculation, then squashing the instructions, to warm up the cache without changing any architectural state. This approach is that it will not cause architectural changes, for example, to PTE bits of the pages that are executed/touched speculatively. However, the instructions, data, and PTEs will be fetched into the caches and TLBs. FIG. 29 is a segment of pseudo-code 2900 illustrating operations in a method for counting the number of AEX during TEE execution in accordance with one embodiment of the present disclosure. Referring to FIG. 29, the pseudo-code triggers transient execution of some target TGT. When fast_counter reaches 0, the slow_counter will be flushed. If the loop mispredicts that execution should continue, fast_counter will be decremented to −1 and TGT will be executed. The execution of TGT will not stop until the CPU detects that this loop iteration has been mis-predicted, which may take a long time because slow_counter (on which the loop termination depends) had been flushed to main memory.

At least some embodiments of the disclosed technologies can be described in view of the following examples:

Example 1 is an apparatus comprising a processing circuitry to detect an occurrence of at least one of a single-stepping event or a zero-stepping event in an execution thread on an architecturally protected enclave; and in response to the occurrence, implement at least one mitigation process to inhibit further occurrences of the at least one of a single-stepping event or a zero-stepping event in the architecturally protected enclave.

Example 2 includes the subject matter of Example 1, comprising circuitry to implement a counter to monitor forward progress of the compute process which is to execute in the architecturally protected enclave; and generate an error signal when the counter indicates that the forward progress is less than a threshold.

Example 3 includes the subject matter of Examples 1-2, comprising circuitry to monitor a frequency of fault events in the execution thread on the architecturally protected enclave; monitor a number instructions that execute between an occurrence of fault events in the execution thread on the architecturally protected enclave; and generate an error signal when a frequency of the fault events is greater than a threshold.

Example 4 includes the subject matter of Examples 1-3, comprising circuitry to detect a page fault within a locked region of a computer-readable memory in the architecturally protected enclave; and in response to the page fault, generate an error signal.

Example 5 includes the subject matter of Examples 1-4, comprising circuitry to implement a counter to monitor a number of asynchronous enclave exit (AEX) events that occur in the architecturally protected enclave; and generate an error signal when the number of asynchronous enclave exit (AEX) events is greater than a threshold.

Example 6 includes the subject matter of Examples 1-5, comprising circuitry to determine one or more memory addresses to be accessed by one or more instructions to be executed by the architecturally protected enclave following an asynchronous enclave exit (AEX) event on the architecturally protected enclave; and initiate a prefetch operation to access the one or more memory addresses.

Example 7 includes the subject matter of Examples 1-6, comprising circuitry to initiate a branch speculation process for the execution thread to warm up a cache memory.

Example 8 is a method comprising detecting an occurrence of at least one of a single-stepping event or a zero-stepping event in an execution thread on an architecturally protected enclave; and in response to the occurrence, implementing at least one mitigation process to inhibit further occurrences of the at least one of a single-stepping event or a zero-stepping event in the architecturally protected enclave.

Example 9 includes the subject matter of Example 8, further comprising implementing a counter to monitor forward progress of the compute process which is to execute in the architecturally protected enclave; and generating an error signal when the counter indicates that the forward progress is less than a threshold.

Example 10 includes the subject matter of Examples 8-9 further comprising monitoring a frequency of fault events in the execution thread on the architecturally protected enclave; monitoring a number instructions that execute between an occurrence of fault events in the execution thread on the architecturally protected enclave; and generating an error signal when a frequency of the fault events is greater than a threshold.

Example 11 includes the subject matter of Examples 8-10, further comprising detecting a page fault within a locked region of a computer-readable memory in the architecturally protected enclave; and in response to the page fault, generating an error signal.

Example 12 includes the subject matter of Examples 8-11, further comprising implementing a counter to monitor a number of asynchronous enclave exit (AEX) events that occur in the architecturally protected enclave; and generating an error signal when the number of asynchronous enclave exit (AEX) events is greater than a threshold.

Example 13 includes the subject matter of Examples 8-12, further comprising determining one or more memory addresses to be accessed by one or more instructions to be executed by the architecturally protected enclave following an asynchronous enclave exit (AEX) event on the architecturally protected enclave; and initiating a prefetch operation to access the one or more memory addresses.

Example 14 includes the subject matter of Examples 8-13, further comprising initiating a branch speculation process for the execution thread to warm up a cache memory.

Example 15 is non-transitory machine readable medium that stores code that when executed by a machine causes the machine to detect an occurrence of at least one of a single-stepping event or a zero-stepping event in an execution thread on an architecturally protected enclave; and in response to the occurrence, implement at least one mitigation process to inhibit further occurrences of the at least one of a single-stepping event or a zero-stepping event in the architecturally protected enclave.

Example 16 includes the subject matter of Example 15, comprising code that when executed by a machine causes the machine to implement a counter to monitor forward progress of the compute process which is to execute in the architecturally protected enclave; and generate an error signal when the counter indicates that the forward progress is less than a threshold.

Example 17 includes the subject matter of Examples 15-16, comprising code that when executed by a machine causes the machine to monitor a frequency of fault events in the execution thread on the architecturally protected enclave; monitor a number instructions that execute between an occurrence of fault events in the execution thread on the architecturally protected enclave; and generate an error signal when a frequency of the fault events is greater than a threshold.

Example 18 includes the subject matter of Examples 15-17, comprising code that when executed by a machine causes the machine to detect a page fault within a locked region of a computer-readable memory in the architecturally protected enclave; and in response to the page fault, generate an error signal.

Example 19 includes the subject matter of Examples 15-18, comprising code that when executed by a machine causes the machine to implement a counter to monitor a number of asynchronous enclave exit (AEX) events that occur in the architecturally protected enclave; and generate an error signal when the number of asynchronous enclave exit (AEX) events is greater than a threshold.

Example 20 includes the subject matter of Examples 15-19, comprising code that when executed by a machine causes the machine to determine one or more memory addresses to be accessed by one or more instructions to be executed by the architecturally protected enclave following an asynchronous enclave exit (AEX) event on the architecturally protected enclave; and initiate a prefetch operation to access the one or more memory addresses.

Example 21 includes the subject matter of Examples 15-20, comprising code that when executed by a machine causes the machine to initiate a branch speculation process for the execution thread to warm up a cache memory.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments require more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
    processing circuitry coupled to a memory, the processing circuitry to:
    detect, using an asynchronous exiting event software handler, an occurrence of at least one of a single-stepping event or a zero-stepping event in an execution thread on an architecturally protected enclave; and
    in response to the occurrence, implement, using at least one of a static contract or a dynamic contract on enclave page locking, a mitigation process to inhibit further occurrences of the single-stepping event or the zero-stepping event in the architecturally protected enclave.

2. The apparatus of claim 1, wherein the processing circuitry is further to:
    implement a counter to monitor forward progress of the compute process which is to execute in the architecturally protected enclave; and
    generate an error signal when the counter indicates that the forward progress is less than a threshold.

3. The apparatus of claim 1, wherein the processor circuitry is further to:
    monitor a frequency of fault events in the execution thread on the architecturally protected enclave;
    monitor one or more instructions that execute between an occurrence of fault events in the execution thread on the architecturally protected enclave; and
    generate an error signal when the frequency of the fault events is greater than a threshold.

4. The apparatus processor of claim 1, wherein the processor circuitry is further to:
    detect a page fault within a locked region of a computer-readable memory in the architecturally protected enclave; and
    in response to the page fault, generate an error signal.

5. The apparatus of claim 1, wherein the processor circuitry is further to:
    implement a counter to monitor a number of asynchronous enclave exit (AEX) events that occur in the architecturally protected enclave;
    generate an error signal when the number of asynchronous enclave exit (AEX) events is greater than the threshold;
    determine one or more memory addresses to be accessed by the one or more instructions to be executed by the architecturally protected enclave following an asynchronous enclave exit (AEX) event on the architecturally protected enclave; and
    initiate a prefetch operation to access the one or more memory addresses.

6. The apparatus of claim 1, wherein the processor circuitry is further to:
    initiate a branch speculation process for the execution thread to warm up a cache memory.

7. A method comprising:
    detecting, by a processor of a computing device, using an asynchronous exiting event software handler, an occurrence of at least one of a single-stepping event or a zero-stepping event in an execution thread on an architecturally protected enclave; and
    in response to the occurrence, implementing, using at least one of a static contract or a dynamic contract on enclave page locking, a mitigation process to inhibit further occurrences of the single-stepping event or the zero-stepping event in the architecturally protected enclave.

8. The method of claim 7, further comprising:
    implementing a counter to monitor forward progress of the compute process which is to execute in the architecturally protected enclave; and
    generating an error signal when the counter indicates that the forward progress is less than a threshold.

9. The method of claim 7, further comprising:
    monitoring a frequency of fault events in the execution thread on the architecturally protected enclave;
    monitoring one or more instructions that execute between an occurrence of fault events in the execution thread on the architecturally protected enclave; and
    generating an error signal when the frequency of the fault events is greater than a threshold.

10. The method of claim 7, further comprising:
    detecting a page fault within a locked region of a computer-readable memory in the architecturally protected enclave; and
    in response to the page fault, generating an error signal.

11. The method of claim 7, further comprising:
implementing a counter to monitor a number of asynchronous enclave exit (AEX) events that occur in the architecturally protected enclave;
generating an error signal when the number of asynchronous enclave exit (AEX) events is greater than the threshold;
determining one or more memory addresses to be accessed by one or more instructions to be executed by the architecturally protected enclave following an asynchronous enclave exit (AEX) event on the architecturally protected enclave; and
initiating a prefetch operation to access the one or more memory addresses.

12. The method of claim 7, further comprising:
initiating a branch speculation process for the execution thread to warm up a cache memory.

13. At least one computer-readable medium having stored thereon instructions which, when executed, cause a computing device to perform operations comprising:
detecting, using an asynchronous exiting event software handler, an occurrence of at least one of a single-stepping event or a zero-stepping event in an execution thread on an architecturally protected enclave; and
in response to the occurrence, implementing, using at least one of a static contract or a dynamic contract on enclave page locking, a mitigation process to inhibit further occurrences of the single-stepping event or the zero-stepping event in the architecturally protected enclave.

14. The computer-readable medium of claim 13, wherein the operations further comprise:
implementing a counter to monitor forward progress of the compute process which is to execute in the architecturally protected enclave; and
generating an error signal when the counter indicates that the forward progress is less than a threshold.

15. The computer-readable medium of claim 13, wherein the operations further comprising:
monitoring a frequency of fault events in the execution thread on the architecturally protected enclave;
monitoring one or more instructions that execute between an occurrence of fault events in the execution thread on the architecturally protected enclave; and
generating an error signal when the frequency of the fault events is greater than a threshold.

16. The computer-readable medium of claim 13, wherein the operations further comprising:
detect a page fault within a locked region of a computer-readable memory in the architecturally protected enclave; and
in response to the page fault, generate an error signal.

17. The computer-readable medium of claim 13, wherein the operations further comprising:
implement a counter to monitor a number of asynchronous enclave exit (AEX) events that occur in the architecturally protected enclave;
generate an error signal when the number of asynchronous enclave exit (AEX) events is greater than the threshold;
determine one or more memory addresses to be accessed by one or more instructions to be executed by the architecturally protected enclave following an asynchronous enclave exit (AEX) event on the architecturally protected enclave; and
initiate a prefetch operation to access the one or more memory addresses.

18. The computer-readable medium of claim 13, wherein the operations further comprising:
initiate a branch speculation process for the execution thread to warm up a cache memory.

* * * * *